United States Patent [19]

Hemp

[11] Patent Number: 5,398,553
[45] Date of Patent: Mar. 21, 1995

[54] ELECTROMAGNETIC FLOWMETER

[75] Inventor: John Hemp, Wootton, England

[73] Assignee: The Foxboro Company, Foxboro, Mass.

[21] Appl. No.: 838,446

[22] PCT Filed: Sep. 19, 1990

[86] PCT No.: PCT/GB90/01442
§ 371 Date: Mar. 31, 1992
§ 102(e) Date: Mar. 31, 1992

[87] PCT Pub. No.: WO91/05225
PCT Pub. Date: Apr. 18, 1991

[30] Foreign Application Priority Data

Sep. 26, 1989 [GB] United Kingdom ............ 89217020

[51] Int. Cl.[6] .............................................. G01F 5/00
[52] U.S. Cl. ........................... 73/861.15; 73/861.12
[58] Field of Search ............ 73/861.12, 861.13, 861.14, 73/861.15, 861.16, 861.17

[56] References Cited

U.S. PATENT DOCUMENTS

| | | | |
|---|---|---|---|
| 2,722,122 | 5/1952 | Soffel | 73/861.15 |
| 3,372,589 | 3/1968 | Mannherz | 73/861.15 |
| 3,942,377 | 3/1976 | Ginzburg et al. | 73/861.15 |
| 4,308,752 | 1/1982 | Appel et al. | 73/861.15 |
| 4,329,879 | 5/1982 | Appel et al. | 73/861.12 |

FOREIGN PATENT DOCUMENTS

| | | |
|---|---|---|
| 1098221 | 1/1961 | Germany . |
| 1914335 | 1/1961 | Germany . |
| 1473041 | 4/1969 | Germany . |
| 1915376 | 10/1970 | Germany . |
| 0019868 | 2/1978 | Japan ............ 73/861.12 |
| 0048276 | 4/1979 | Japan ............ 73/861.15 |
| 0139756 | 10/1979 | Japan ............ 73/861.15 |
| 802017 | 9/1958 | United Kingdom . |
| 1417463 | 5/1973 | United Kingdom . |
| 1385849 | 3/1975 | United Kingdom . |
| 0433851 | 11/1976 | U.S.S.R. ............ 73/861.15 |
| 1290075 | 2/1987 | U.S.S.R. ............ 73/861.12 |

OTHER PUBLICATIONS

International Search Report; PCT/GB90/01442; Dec. 12, 1990; European Patent Office.
Examiner's report to the Comptroller under Section 17 (The Search Report); Application No. 8921702.2; Examiner H. Collingham; Dec. 13, 1989; UK Patent Office.

Primary Examiner—Richard E. Chilcot, Jr.
Assistant Examiner—R. Biegel
Attorney, Agent, or Firm—Fish & Richardson

[57] ABSTRACT

An electromagnetic flowmeter with conventional orthogonal electrode and magnetic axes (x, y) intersecting the flowtube axis (z) has its electrodes constituted by two pairs (1, 2 and 3, 4) of electrodes mounted in insulating tubing (5) on each side of the flow passage through the tubing. Four conductors extend respectively from the four electrodes to enable the potential difference between the two electrodes on each side due to an axial component on each side of eddy current electric field in the liquid to be determined for self-calibration purposes in compensating automatically for any extraneous change in the magnetic field and the average potential of each pair of electrodes can also be determined to derive the velocity of flow of the liquid. One of the two pairs of electrodes can be replaced by a single electrode. The electrodes can be point electrodes or electrodes of substantial area and methods are described for mathematically adapting various types of electrodes of the required purpose and to eddy currents in parts of the assembly. The invention can also be applied to an eddy current probe for giving readings of sensitivity at a conventional flowmeter.

19 Claims, 13 Drawing Sheets

Section X-X

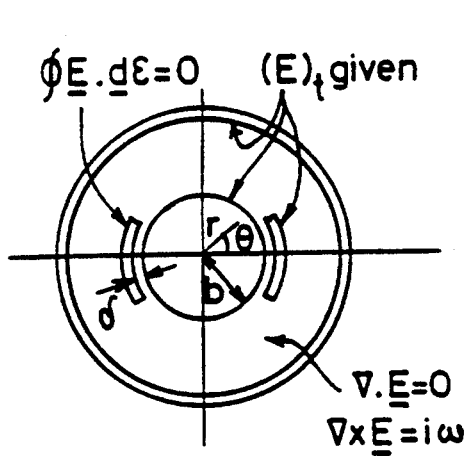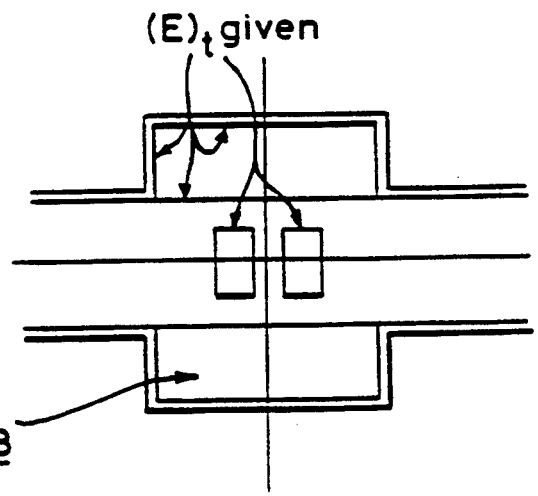
FIG. 14a  FIG. 14b
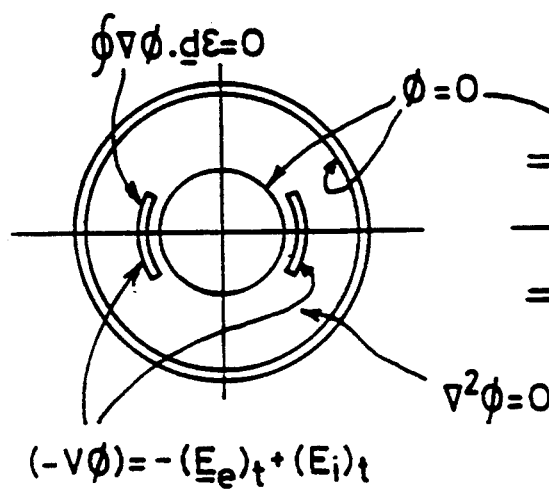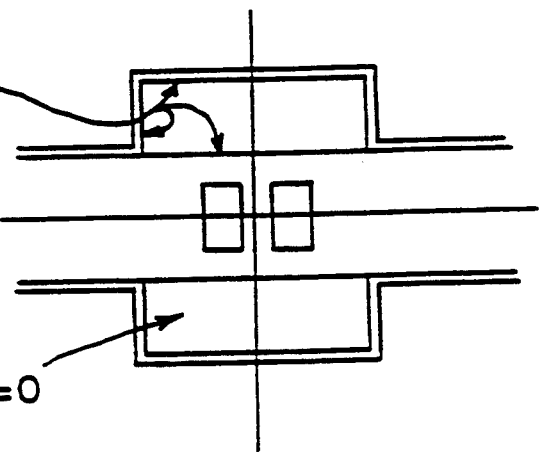
FIG. 15a  FIG. 15b

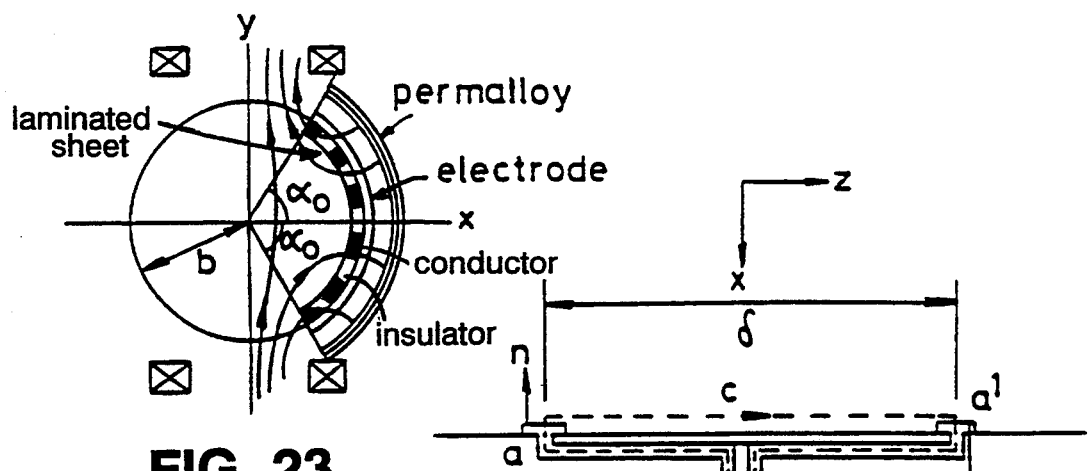
FIG. 23
FIG. 24
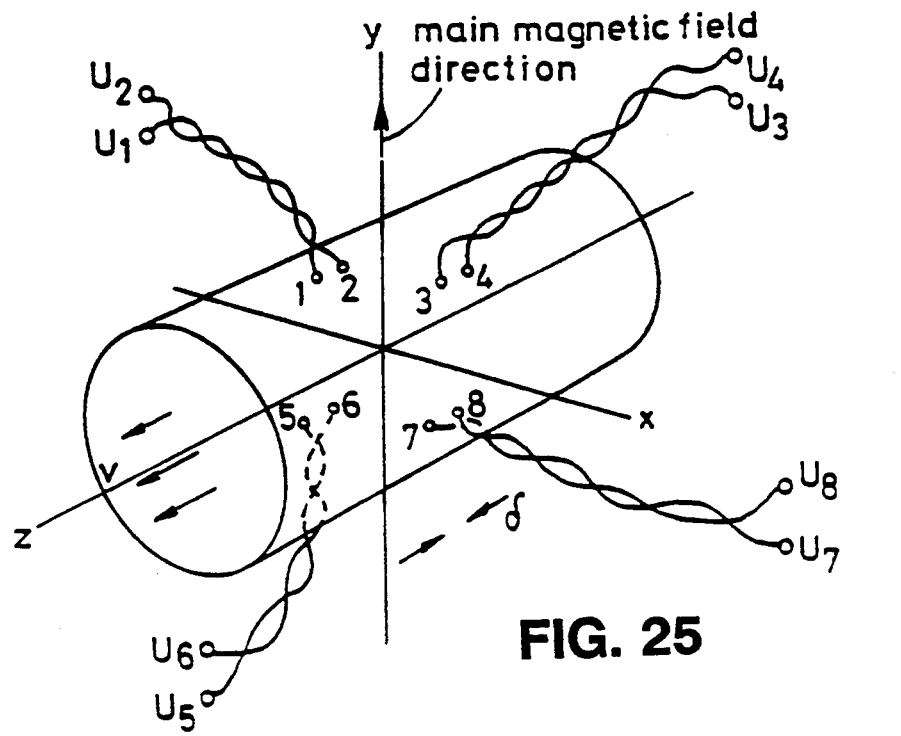
FIG. 25

5,398,553

ELECTROMAGNETIC FLOWMETER

This invention relates to electromagnetic flowmeters of the kind in which a liquid having an electrolytic property is caused to flow through a tube on a z axis intersected by an alternating or pulsating magnetic field on a y axis so that a potential difference between electrodes can be measured for the velocity of flow to be estimated according to the Faraday effect, the electrodes being mounted on opposite sides of the tube on an x axis perpendicular to the y and z axes. Changes in the strength or distribution of the magnetic field or changes in the contact impedance between adjoining pipes and the liquid can result in inaccurate flow velocity measurements.

An effect of the alternating or pulsating magnetic field is to produce an eddy current in the liquid, whether flowing or not, which has an electric field with $E_z$ and $-E_z$ components respectively adjacent the two electrodes.

It is, therefore, a main object of the present invention to introduce into an electromagnetic flowmeter a self-calibration function that compensates for any magnetic field changes and for changes in contact impedance between adjoining pipes and the liquid, which compensation is virtually insensitive to velocity profile effects in the liquid.

According to one aspect of the invention an electromagnetic flowmeter assembly comprises an insulating tube arranged for an electrolytic liquid to flow therethrough while the velocity of the passing liquid is determined, a magnet arranged for producing a periodically changing magnetic field on an axis (y) substantially perpendicular to the tube axis (z) and electrodes on opposite sides of the tube positioned according to a transverse axis (x) substantially intersecting the tube axis and passing though the magnetic field when produced by the magnet, characterised in that on one side of the tube there are two of said electrodes mounted side-by-side, being equidistantly spaced from said transverse axis (x) on a line substantially perpendicular thereto, and on the other side of the tube at least one electrode positioned in predetermined relationship to the said two electrodes, and that conductors extend individually from the electrodes whereby, in the operation of the assembly, the potential difference between the two side-by-side electrodes due to an axial component of an eddy current electric field in the liquid can be determined for self-calibration purposes in compensating automatically for any extraneous change in said magnetic field and the potentials of all the electrodes can also be determined to derive the velocity of flow of the liquid.

According to another aspect of the invention an electromagnetic flowmeter assembly comprises an insulating tube arranged for an electrolytic liquid to flow therethrough while the velocity of the passing liquid is determined, a magnet arranged for producing a periodically changing field on an axis (y) substantially perpendicular to the tube axis (z) and electrodes on opposite sides of the tube positioned according to a transverse axis (x) substantially intersecting the tube axis and passing through the magnetic field when produced by the magnet, characterised in that on one side of the tube there are two of said electrodes mounted side-by-side, being equidistantly spaced from said transverse axis (x) on a line substantially perpendicular thereto, and on the other side of the tube at least one electrode positioned in predetermined relationship to the said two electrodes, and that conductors extend individually and respectively from said electrodes and from a current to voltage converting device responsive to the periodically changing magnetic field to phase-detecting means for providing self-calibration in compensating automatically for any extraneous change in said magnetic field to means whereby the potentials of all the electrodes can also be determined to derive the velocity of flow of the liquid.

In order that the invention may be clearly understood and readily carried into effect flowmeters in accordance therewith will now be described, by way of example, with reference to the accompanying drawings, in which:

FIGS. 14a and 14b are respectively a cross-section and a longitudinal section of a flowmeter;

FIGS. 15a and 15b are respectively a cross-section and a longitudinal section of a flowmeter;

FIGS. 20a and 20b, 21a and 21b, 22a and 22b show front and side elevations of three further arrangements of juxtaposed electrodes;

FIG. 23 is a diagrammatic cross-section showing a further detail;

FIG. 24 is a diagram showing another arrangement of electrodes and their connections;

FIG. 25 is a diagrammatic perspective view of yet another form of flowmeter.

Figure 26:
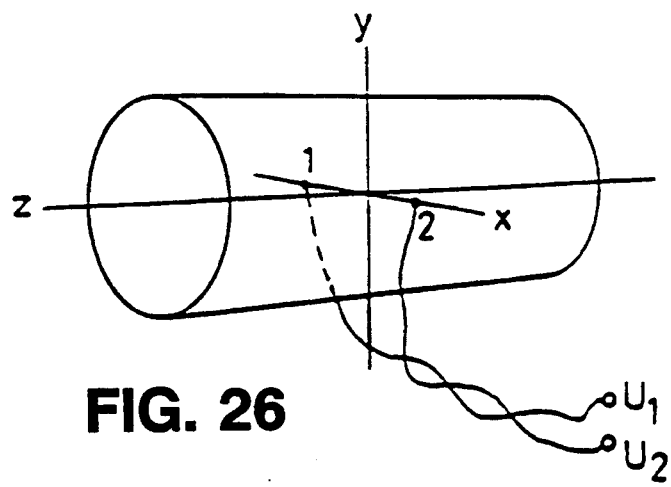
Figure 27:
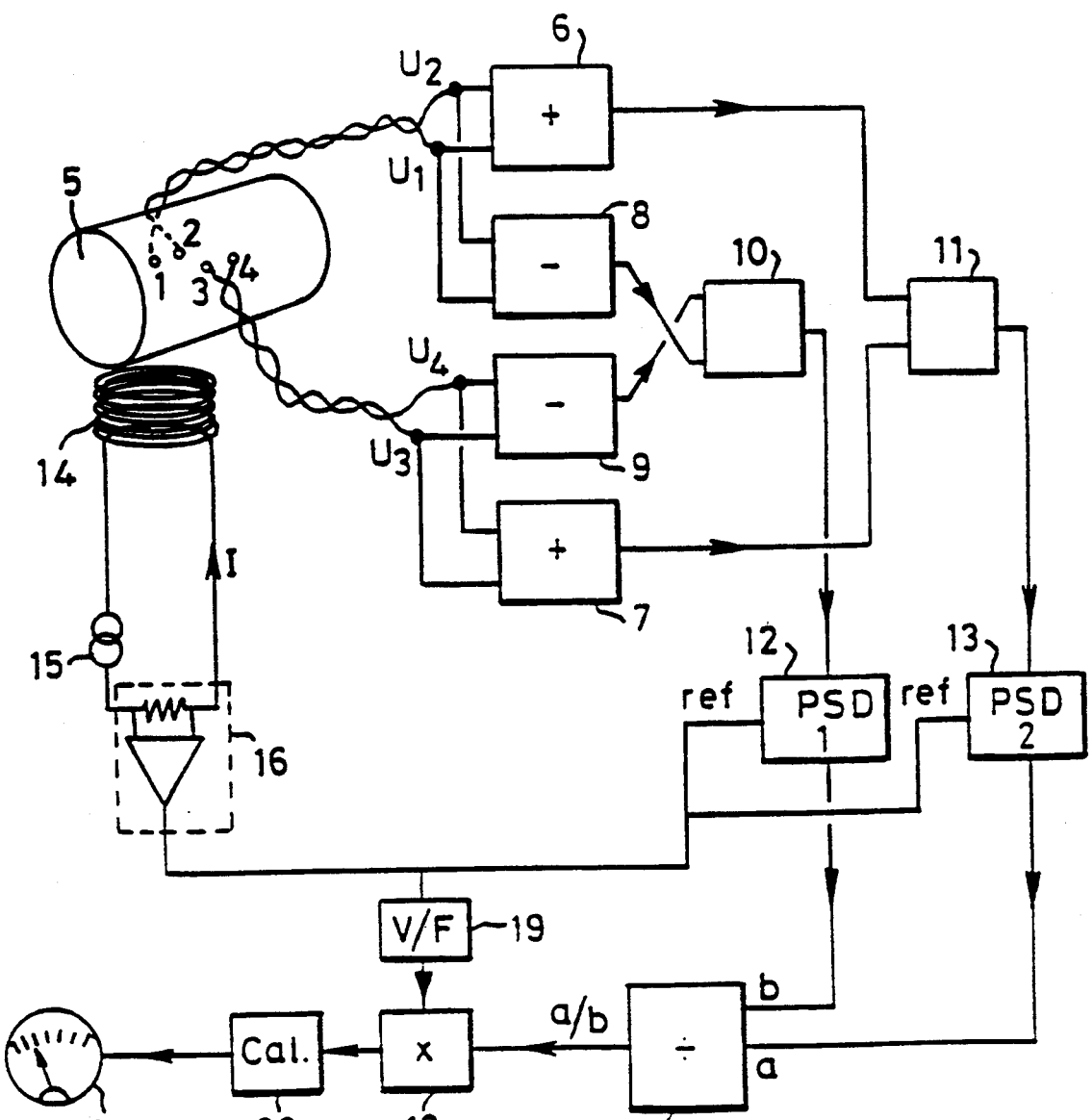
Figure 28A:
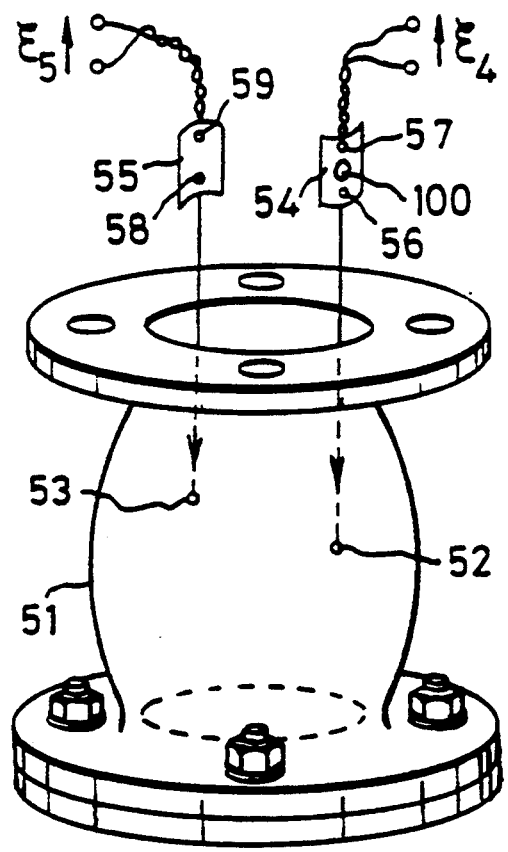
Figure 28B:
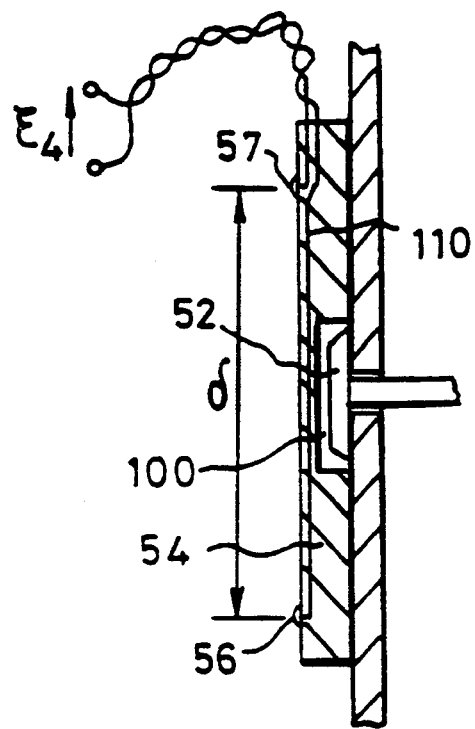

FIG. 26 is a further explanatory diagram;

FIG. 27 is a circuit diagram showing electronic connections made to an electromagnetic flowmeter to enable the flowmeter to be used;

FIG. 28a is a perspective view showing a method of using an eddy current probe in an electromagnetic flowmeter; and FIG. 28b is a vertical section showing a detail of FIG. 28a.

A conventional electromagnetic flowmeter measures the velocity of an electrolytic liquid flowing in a pipe by sensing the potential difference generated by the liquid as it moves through an external magnetic field. Thus with reference to FIG. 26 the liquid flows (in the z direction) through a tube of insulating material and a magnetic field is present (in the y direction). As the liquid moves it generates a voltage across diametrically opposed electrodes 1 and 2 which are situated on the x axis on the inside walls of the tube. The potential difference $U_1 - U_2$ is proportional to the average liquid velocity v and is thus a measure of that velocity or of the total volume flowrate. In the invention means are introduced for compensating for the effects of variation in the magnetic field or of variation in the conductivity of the internal surfaces of tubes joined to the ends of the meter. Either kind of variation can alter the constant of proportionality between $U_1 - U_2$ and v. The method of compensation shown in FIG. 3 involves the use of four electrodes rather than two. Thus each electrode in FIG. 26 is replaced by a pair of electrodes one slightly upstream and one slightly downstream of the position of the original electrode. To obtain the velocity measurement the mean values of the potentials of each pair are used; the difference $\Delta U = \frac{1}{2}(U_1 + U_2) - \frac{1}{2}(U_3 + U_4)$ being proportional to the average flow velocity v. The constant K of proportionality connecting $\Delta U$ and v can be obtained from measurements of the potential differences $\epsilon_1 = U_1 - U_2$ and $\epsilon_2 = U_4 - U_3$ which arise because of eddy currents induced in the liquid by the time variation of the magnetic field. Derived in this way and in certain circumstances, the constant K automatically adjusts itself to the correct value whenever the magnetic field changes or whenever the contact impedance of pipes joined onto the flowmeter ends changes. This automatic adjustment of K is a consequence of a rather subtle mathematical relation between flow induced voltages and eddy current electric fields. The details of this mathematical aspect of the invention are given below.

Figure 9A:
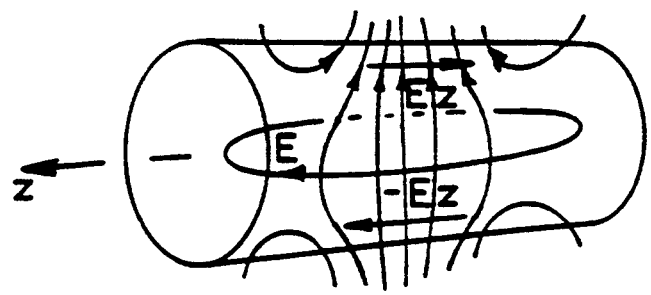
FIGS. 9a and 9b are diagrams showing magnetic fields in flowmeters.

The idea of a self-calibrating electromagnetic flowmeter using an eddy current E field (FIG. 9(a)) measurement is based on the mathematical relation $$\frac{U}{v} = \frac{E_z}{i\omega} \quad (1)$$

which holds (in any flow tube) between the potential U induced by a flat profile of speed v and the z component of the E field associated with eddy currents induced in the liquid. $i\omega$ represents the cyclic excitation of the magnetic field. Assuming no end effects on virtual current, (1) holds at every point in the liquid, the factor $e^{-i\omega t}$ expressing the time dependence of the fields.

Figure 1:
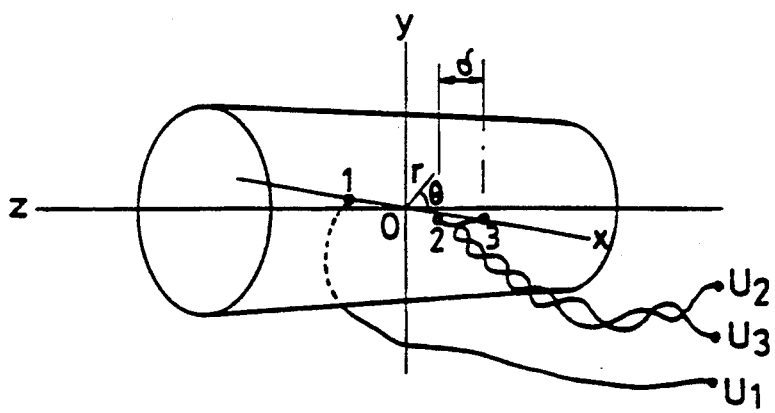
FIG. 1 is a diagrammatic perspective view of one form of flowmeter.

In its most simple form the self-calibrating flowmeter consists of three small contacting electrodes positioned as shown in FIG. 1. Electrode 1 is in its usual position but on the other side we have two electrodes 2 and 3. 2 is positioned slightly downstream and 3 slightly upstream of the usual electrode position. Let $\delta$ be the separation of electrodes 2 and 3. In normal operation the flow signal $\Delta U$ is derived from the potential U at the end of electrode wires using the formula $$\Delta U = R \left( U_1 - \frac{U_2 + U_3}{2} \right) \quad (2)$$

where R(X) means the component of X in phase with the reference (derived, for example, from magnet current). To obtain self-calibration the flat profile sensitivity S (i.e. the quantity $\Delta U$ that would be measured for a flat profile of unit speed) is derived using the formula $$S = \frac{\Delta U}{v} = \frac{2}{\omega \delta} R_\perp (U_3 - U_2) \quad (3)$$

where $R_\perp(X)$ means the component of X one right angle (90°) in advance of the reference phase. Provided $\delta$ is small and there is negligible magnetic flux through loops in electrode wires it follows from (1) that (3) is a valid expression for S.

ADAPTATION FOR VARIOUS WAVEFORMS

Figure 2A:
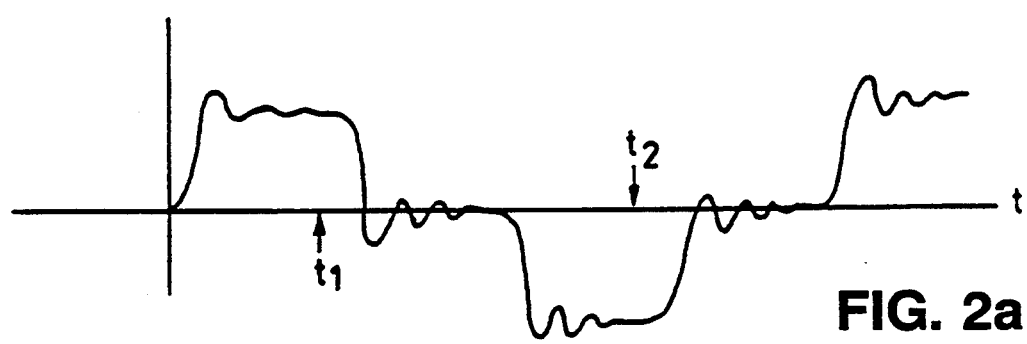
FIGS. 2a and 2b are explanatory graphs.
Figure 2B:
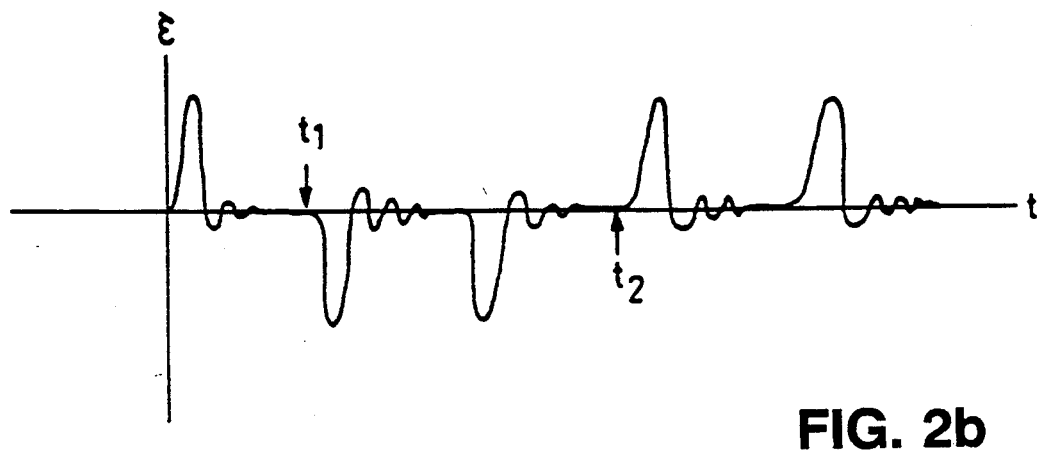

Self-calibration can work just as well with non a.c. modes of magnet excitation. For example with 'keyed dc' excitation and the electrode configuration of FIG. 1 the B field or flow signal $$\Delta U = U_1 - \frac{U_2 + U_3}{2}$$

and the emf $$\epsilon = U_3 - U_2$$

have the forms shown in FIGS. 2(a) and 2(b). Since at any point in the liquid U and $E_z$ are periodic functions of time we have $$U = \sum_{n=-\infty}^{\infty} U_n e^{-in\Omega t}$$

$$E_z = \sum_{n=-\infty}^{\infty} (E_z)_n e^{-in\Omega t}$$

For each Fourier component (1) holds, i.e.

$$\frac{U_n}{v} = \frac{(E_z)_n}{in\Omega}$$

$$\therefore \frac{1}{v} \frac{\partial U}{\partial t} = \Sigma \frac{U_n}{v} e^{-in\Omega t}(-in\Omega)$$

$$= \Sigma - (E_z)_n e^{-in\Omega t}$$

$$= -E_z$$

Hence $$\frac{1}{v} \frac{\partial}{\partial t} \Delta U = -\frac{3}{\delta} \epsilon$$

or integrating between the times $t_1$ and $t_2$ (FIGS. 2a and 2b) at which measurements of $\Delta U$ are taken.

$$S = \frac{(\Delta U)_{t1} - (\Delta U)_{t2}}{v} = -\frac{2}{\delta} \int_{t_1}^{t_2} \epsilon \, dt$$

In other words the sensitivity is derived by integrating $\epsilon$ over the time interval $t_1$ to $t_2$.

MAGNETIC END EFFECTS

Figure 3:
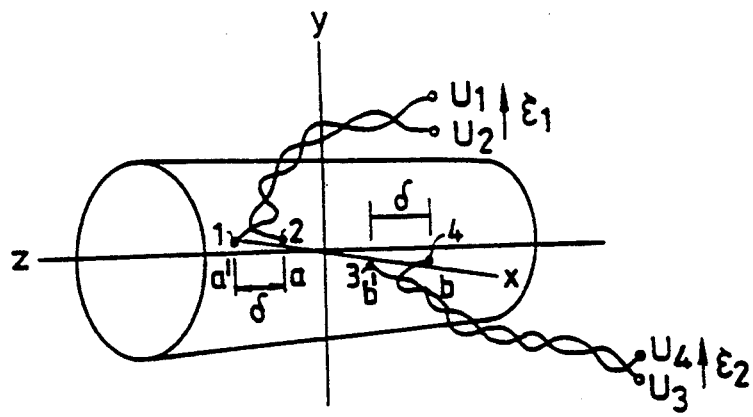
FIG. 3 is a diagrammatic perspective view of another form of flowmeter.

Self-calibration compensates exactly for any variation in the magnetic field (shape, strength or phase). Note, however, that to compensate for variations of the B field which violate normal symmetry, four electrodes are needed (i.e. electrode 1 in FIG. 1 has to be replaced by a pair lake 2 and 3 on the other side) and measured emfs must be compounded appropriately. Thus with small point electrodes a fully fledged self-calibrating flowmeter is as illustrated in FIG. 3 and in ac excitation the flow signal is $$\Delta U = R\left(\frac{U_1 + U_2}{2} - \frac{U_3 + U_4}{2}\right) \quad (4)$$

and the sensitivity is $$S = \frac{1}{\omega\delta} R_1[(U_4 - U_3) - (U_2 - U_1)] \quad (5)$$

NON-FLAT VELOCITY PROFILES

If an electromagnetic flowmeter is to be self-calibrating in conditions of variable velocity profile, it is necessary that (i) the flow tube be designed to approach an ideal configuration; i.e. magnetic field and virtual current shapes optimised and (ii) the variations in velocity profile be not too great. This is seen mathematically as follows: Let the design configuration have magnetic flux density $\underline{B}_o$ and virtual current $\underline{j}_o$. In production (or in ageing or with end effects ... etc) $\underline{B}$ and $\underline{j}$ will differ from the designed fields $\underline{B}_o$ and $\underline{j}_o$. Therefore suppose $\underline{B}$ is in fact $\underline{B}_o + \underline{B}'$ and $\underline{j}$ is in fact $\underline{j}_o + \underline{j}'$. Let the velocity profile be $\overline{v}_o + \overline{v}'$ where $v_o$ is a flat profile and $v'$ a flow of zero total flow rate. The change in flow signal is now $$\sigma U = \int (v_o + v').(B_o + B') \times (j_o + j') \, dV - \int v_o B_o \times j_o \, dv \quad (6)$$

Assuming $B' << B_o$, $j' << j_o$ and $v' << v_o$, then to first order $$\sigma U = \int v_o.B_o \times j' dV + \int v_o.B' \times j_o \, dV + \int v' \, B_o \times j_o \, dV \quad (7)$$

With self-calibration the estimated mean velocity $\overline{v}$ is $$v = \frac{\Delta U}{S} \quad (8)$$

where $\Delta U$ is the flow signal and $S$ the sensitivity obtained by eddy current $\underline{E}$ field measurement. Therefore the fractional error $\sigma\overline{v}/\overline{v}$ in mean velocity is:

$$\frac{\delta v}{v} = \frac{\delta U}{U} - \frac{\delta S}{S} \quad (9)$$

where $\sigma U/U$ and $\sigma S/S$ are the fractional changes in $U$ and $S$. Now $\sigma U$ is made up of three parts, i.e. the three integrals in (7). Since self-calibration compensates exactly for any magnetic field change, the second integral causes a change $\sigma U/U$ which is exactly cancelled by the corresponding change $\sigma S/S$. Therefore the second integral in (7) causes no error in $\overline{v}$. On the other hand the third integral in (7) causes a $\sigma U/U$ which has no counterpart in $\sigma S/S$ (the eddy current $\underline{E}$ field does not depend on v!). Therefore the velocity profile error goes straight through to an equal fractional error in $\overline{v}$. This is the reason that the electrode/magnet configuration must be optimised. $\nabla \times (\underline{B}_o \times \underline{j}_o)$ is then small (in some sense) and the third integral in (7) is negligible.

If deviations from a flat profile are not small (e.g. very near a bend or in laminar flow) the higher order terms $$\int v'.B' \times j_o \, dV + \int v'.B_o \times j' \, dV \quad (10)$$

need to be included in (7). Since $B'$ or $j'$ arise from unpredictable causes $\nabla \times (\underline{B}' \times \underline{j}_o)$ or $\overline{\nabla} \times (\underline{B}_o \times \underline{j}')$ are not small and errors in $\overline{v}$ will be present. To estimate the errors we could say that the integrals in (10) have the approximate values $\overline{v}'.\overline{B}'.\overline{j}_o.V$ and $\overline{v}'.\overline{B}_o \overline{j}'.V$ where the bar hence denotes the means values in the effective volume V of the flowmeter. However we know from experience that purely circulating flows like $v'$ are, in practice, unlikely to produce flow signals in excess of 3% of the magnitude estimates $\overline{v}'.\overline{B}'.\overline{j}_o.V$ and $\overline{v}'.\overline{B}_o.\overline{j}'.V$. This fact together with the assumption that $B'$ and $j'$ are $<<B_o$ and $j_o$ respectively means that the higher order terms (10) are probably negligible even if $v'$ is not small compared with $v_o$.

The remaining source of error is the first integral in (7). This arises from changes in virtual current which could be due to end effects, inaccurate positioning of electrodes ... etc. However changes $\sigma U/U$ due to end effects on virtual current can be cancelled to a greater or lesser extent by corresponding changes $\sigma S/S$ in sensitivity measurement.

ADAPTATION FOR ELECTRICAL END EFFECTS

Self-calibration does not compensate exactly for end effects on virtual current. This rules out the possibility of very short flow tubes insensitive to the properties of adjoining pipes. However, partial compensation to end effects on virtual current can be obtained and this implies the possibility of some degree of shortening of flowmeters without loss of accuracy.

FIGS. 3, 4a, 4b and 12 show embodiments of the invention in which the pairs of electrodes 1, 2 and 3, 4 are held in an annular liner consisting of a mass of dielectric material 5 in an expansion 6 of the flowtube 7, the mass 5 being formed with a bore 8 in exact register with the internal surface of the unexpanded portion of the flowtube 7. The expansion 6 may be regarded as a grounded screen.

Figure 4A:
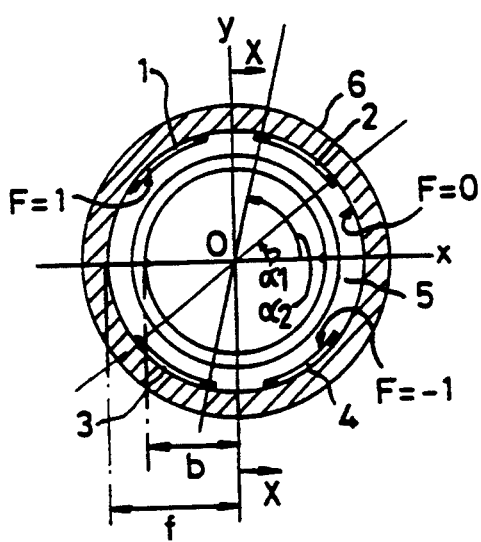
FIGS. 4a and 4b are a cross section and a longitudinal section of a portion of the flowmeter of FIG. 3.
Figure 4B:
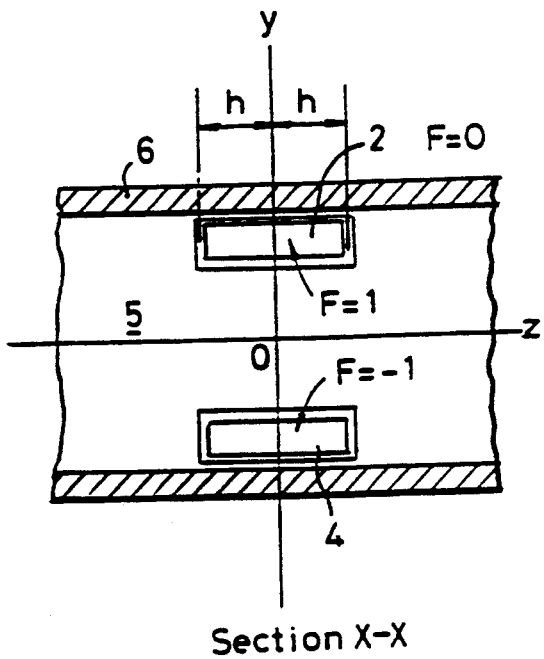

For the purpose of analysis the magnet coil, electrical steel, stainless steel tube, adjoining tubes (when these are steel, copper or another metal) and any other metal parts of the flowtube (except the electrodes, electrode wires, screens ... etc) are considered to constitute the 'magnet'. The rest of space is then termed the 'external' region. Thus in an assembly such as shown in FIGS. 3, 4a and 4b the external region consists of the liner, the liquid, the electrodes, the electrode wires extending from the electrode beyond the flowtube, the screens around electrode wires ... etc. Eddy currents may be present in parts of the magnet and these contribute to the $\underline{B}$ field in the external region. However, these eddy currents (being in highly conducting material) are independent of the properties of parts of the external region (e.g. liquid conductivity or contact impedance between liquid and adjoining pipes) so that in the external region, B depends only on properties of the magnet and so is a given external field. Also the $\underline{E}$ field in parts of the magnet is (to first order) independent of the properties of the external region and so provides a definite term in the boundary conditions for the $\underline{E}$, $\underline{D}$ and $\underline{j}$ fields in the external region where $D = \epsilon E$. In parts of the magnet we denote the $\underline{E}$ field by $\underline{E}'$. Eddy currents in the external region (e.g. in the liquid or electrodes) are, of course, assumed to produce negligible secondary magnetic fields.

Equations for the fields in the external region can be derived from Maxwell's equations in their vector form.

Effects of previous history (e.g. previous currents across the interface between liquid and adjoining pipes) are neglected and the contact impedance at a metal liquid interface is regarded as a definite complex function of frequency and position on the interface, and secondary magnetic fields are negligible. Then the fields are separated into eddy current and flow induced parts.

The equations for the flow induced potential U in the liquid are (for flat profile flow)

$$\nabla^2 U = 0 \tag{11}$$

$$\frac{\partial U}{\partial r} = (v \times B_r) \tag{12}$$

$$= -vB_\Theta \text{ on the liner}$$
(using the polar coordinates of FIG. 1)

$$U + \tau\delta\left(\frac{\partial U}{\partial r} + vB_\Theta\right) = 0 \text{ on adjoining pipes} \tag{13}$$

These equations determine U in the liquid uniquely (where $\tau$ is the contact impedance between liquid and adjoining pipe and $\sigma$ is the conductivity of the liquid).

In the case of the eddy current $E_z$ field in the liquid, the equations are $$\nabla^2 E_z = 0 \tag{14}$$

$$\frac{\partial E_z}{\partial r} = -i\omega B_\Theta \text{ on liner} \tag{15}$$

$$E_z + \gamma\delta\left(\frac{\partial E_z}{\partial r} + i\omega B_\Theta\right) = E_z - \delta E \frac{\partial \tau}{\partial z} \text{ on adjoining pipes} \tag{16}$$

Equations (14), (15) and (16) are similar to equations (11), (12) and (13) and if only the R.H.S. of (16) was zero we would have the identity $$\frac{U}{v} = \frac{E_z}{i\omega} \tag{17}$$

as required for self-calibration. The condition for effective compensation of virtual current end effects is therefore that $$E_z' = \delta E_r \frac{\partial \tau}{\partial z}$$

small. Since $E_z'$ is independent of $\tau$ we require the separate conditions that $E_z'$ and $\sigma E_r \partial\tau/\partial z$ are both small compared with the value of the LHS of (16) at points in the liquid in the end regions of the flow tube. In order of magnitude, the ratio of the two terms on the LHS of (16) is $\tau\sigma/b$ (where b is the tube radius). This quantity can take any value in practice from a value $<<1$ to a value $>>1$. Therefore to cater for all likely situations we require the conditions $$E_z' << E_z \tag{18}$$

and $$\frac{1}{\tau} \frac{\partial\tau}{\partial z} << \frac{1}{E_r}\left(\frac{\partial E_z}{\partial r} + i\omega B_\Theta\right)$$

The LHSs of these conditions are evaluated at the wall of the adjoining tube and the RHSs are orders of magnitude at points in the liquid in the end regions of the flow tube. The second condition is equivalent to $$\frac{1}{\tau} \frac{\partial\tau}{\partial z} << \frac{1}{E_r} \frac{\partial E_r}{\partial z} \tag{19}$$

or $$l_\tau >> b$$

where $l_\tau$ is the characteristic distance of variation of $\tau$. (18) and (19) are necessary and sufficient conditions for good compensation of virtual current end effects under all conditions likely to be met in practice.

In the least favourable case from the point of view of the effect of $E_z'$ (i.e. for $\tau\sigma/b << 1$) the extent to which (18) is satisfied is directly the extent to which compensation is achieved. Thus if $E_z' = 1/10$th of $E_z$ in the end regions of the flowmeter we expect compensation to within about 10%. In the least favourable case from the point of view of the effect of $\partial T/\partial z$ (i.e. for $\tau\sigma/b >> 1$) the extent to which (19) is satisfied is not so directly related to the degree of compensation obtained. This is because $\partial\tau/\partial z$ is probably a random function of position on the liquid/adjoining pipe interface. It is unlikely that this function will be the most unfavourable function so the degree of compensation achieved is likely to be better than the ratio $l_\tau/b$ might suggest. The effect of the constant (mean) part of $\tau$ is (in the absence of $E_z'$) exactly compensated by self-calibration and exact compensation is still present if $\tau$ is a function of $\Theta$ only.

A key requirement for good compensation of virtual current end effects therefore seems to be that the eddy current $E_z'$ field in the adjoining pipes be small compared with the eddy current $E_z$ field in the liquid at the flow tube ends. This leads us to the calculation of the $E_z$ fields.

To start off we calculate $E_z$ in the liquid with the idealised magnet as illustrated in FIGS. 4a and 4b. The liner on r=b is assumed to extend indefinitely in the $\pm z$ directions. Although this configuration does not occur in practice it serves to obtain the order of magnitude of $E_z$ in the liquid at the ends of a typical flow tube.

For r<f (FIGS. 4a and 4b) the magnetic potential F $(r,\Theta,z)$ is $$F(r,\Theta,z) = \sum_{m=1,3...}^{\infty} \sin m\Theta \int_{-\infty}^{\infty} A_m(\beta)I_m(\beta r)e^{i\beta z}d\beta \tag{20}$$

In (20) $A_m$ is a function depending on f, h, $a_1$, $a_2$ (see FIGS. 4a and 4b).

Then from (20), (14), (15) it is possible to obtain an expression for the $E_z$ field in the liquid which is approximately valid for z>h (FIG. 8) and perfectly correct for $z \to \infty$.

In order to calculate $E_z'$ in an adjoining pipe, it is necessary to consider the interaction of the pipe with the magnetic field just outside the flow tube.

Various physically different cases arise in practice. In one case the permeability of adjoining pipe may be low (as in stainless steel) and the magnetic field may not be greatly affected. The eddy currents and the E field can in this case be calculated by regarding the magnetic field as a given external field (secondary magnetic fields due to the eddy currents being assumed small). In another case the permeability of adjoining pipe may be high (as in mild steel or cast steel pipes). The magnetic field in this case is greatly affected and the eddy currents and the $\underline{E}$ field may be effectively confined to a narrow layer at the surface of the pipe (skin depth).

Although the physics is different the order of magnitude of $E_z'$ in the various cases is the same. This is essentially because Faraday's Law $$E \cdot dl = -\dot{\Phi}$$

holds universally and the flux $\Phi$ is the same order of magnitude in all cases. By choosing an appropriate contour we obtain in order of magnitude $$E_z' = 1\omega b B \tag{21}$$

where b is the pipe radius and B the order of magnitude of the magnetic flux density at the end of the flow tube.

However, to be more exact in the estimation of $E_z'$ we study in more detail the nature of the interaction of a permeable conductor with an alternating magnetic field and then work out an exact expression for the $\underline{E}$ field in a pipe situated in the far field of the idealised magnet (assuming secondary magnetic fields are small). The interaction of a permeable conductor with an ac magnetic field is relevant to the problem of predicting magnetic end effects and is therefore worthy of consideration from this point of view also.

Of first importance here is the concept of skin depth $\sigma_s$ defined as $$\delta_s = \sqrt{\left(\frac{2}{\mu\delta\omega}\right)} \tag{22}$$

where $\mu$ and $\sigma$ are the permeability and conductivity of the conductor and $\omega(=2\pi f_o)$ the angular frequency of the field. $\sigma_s$ is a measure of the depth to which the magnetic field can penetrate the conductor. In the present application $f_o$ can be 60 Hz (mains excitation). In keyed dc excitation or triangular wave form excitation the fields can be analysed into harmonics ranging from $f_o = 3$ Hz to about $f_o = 100$ Hz. Some examples of the magnitude of $\sigma_s$ at 20° C. are given in Table 1.

TABLE 1

| Material | $o\left(\frac{1}{\Omega m}\right)$ | $\mu/\mu_o$ | $f_o = \frac{\omega}{2\pi}$ (Hz) | $\delta_s$(mm) |
|---|---|---|---|---|
| Mild steel or Cast steel | $-10^7$ | 800 (B = .1T) | 3 | 3.2 |
| | | | 60 | 0.7 |
| | | | 100 | 0.6 |
| Stainless Steels | $-1.4 \times 10^6$ | 1 to 10 | 3 | 246 to 76 |
| | | | 60 | 55 to 17 |
| | | | 100 | 43 to 13 |
| Copper | $5.9 \times 10^6$ | 1 | 3 | 12 |
| | | | 60 | 2.7 |
| | | | 100 | 2.1 |

These suggest that when the magnet field of an electromagnetic flowmeter interacts with adjoining steel pipe (other than stainless) $\sigma_s$ is quite small and the field is hardly able to pass through the thickness of pipe except perhaps at the lower frequencies.

Figure 5:
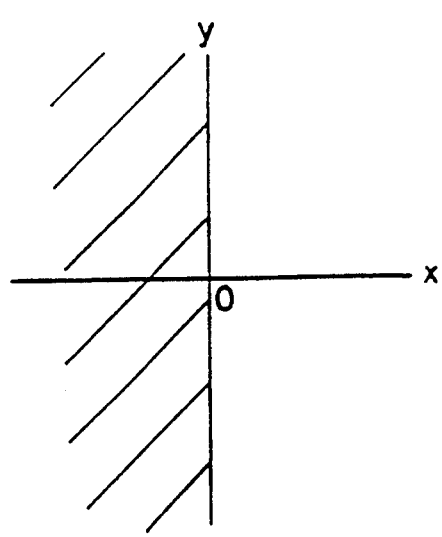
FIGS. 5 and 6 are explanatory diagrams.
Figure 6:
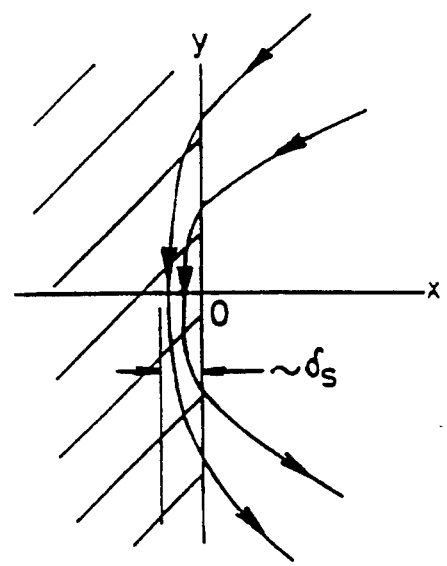

By using the basic equations governing the interaction of a permeable conductor with an alternating magnetic field it can be shown with reference to FIGS. 5 and 6 that if the simple field $B_x = \partial A/\partial y$, $By = -\partial A/\sigma a$ (where $A = e^{\alpha x} \sin \alpha y$) interacts with the permeable conductor in $x = 0$ then on $x = 0$ $$R_1 m \left| \frac{(B_x)_{max}}{(B_y)_{max}} \right| = \left| \frac{\mu}{\mu_0} \quad \frac{\alpha}{Y} \right| = \frac{\mu}{\mu_0} \frac{\alpha\delta_s}{((\alpha\sigma)^4 + 4)^{1/4}} \tag{23}$$

where Y is short for $(\alpha^2 + i \mu\sigma\omega)^{\frac{1}{2}}$ and $\alpha^{-1}$ is a measure of the spacial dimension of the magnetic field. This gives the conditions under which simple boundary conditions on B may be assumed on the outside surface of the conductor. If $(\underline{B})_t$ and $(\underline{B})_n$ are the tangential and normal components of the magnetic field we can assume $$(B)_t = 0 \text{ if } R_1 >> 1 \tag{24}$$

$$(B)_n = 0 \text{ if } R_1 << 1 \tag{25}$$

Case (24) occurs when $\omega \to 0$ (provided $\mu/\mu_o >> 1$) and represents the usual boundary condition at a highly permeable material. Case (25) occurs when $\omega \to \infty$ (for any $\mu/\mu_o$) and is the case of tonal exclusion of the field from the conductor. Note that $\sigma_s$ may be $<<1/\alpha$ (the characteristic dimension of the $\underline{B}$ field) and yet (24) may still hold for sufficiently large $\mu/\mu_o$. Values of $R_1$ for mild steel or cast steel and for various $1/\alpha$ values and frequencies are given in table 2.

TABLE 2

| | | 1/α (mm) | | |
|---|---|---|---|---|
| | 10 | 50 | 100 | 150 |
| $f_o$(Hz) 3 | 180 | 35 | 18 | 12 |
| 60 | 40 | 8 | 4 | 2.7 |
| 100 | 33 | 6.4 | 3.3 | 2.1 |

These are obtained using (23) which, since $(\alpha\sigma_s)^4 << 1$ in this case, reduces to $R_1 = 800 \; \alpha\sigma_s/2$. Table 2 suggests that when the magnetic field of electromagnetic flowmeters interacts with adjoining steel pipes (other than stainless) boundary condition (24) operates at least approximately except at the upper limits of flowtube sizes and frequencies.

It can be shown with respect to FIG. 6 that for the x and y components of flux density in the material the following expressions exist $$B_x = \frac{2e^x}{1 + \frac{\gamma_0}{\mu} \frac{}{\alpha}} \alpha \cos \alpha y \tag{26}$$

$$B_y = -\frac{2 \; e^x}{1 + \frac{\gamma_0}{\mu} \frac{}{\alpha}} \sin \alpha y$$

When skin depth is not small (i.e. $\sigma_s \sim 1/\alpha$) flux density is of course of the same order of magnitude in the material as outside it. When $$\delta_s << \frac{1}{\alpha} \tag{27}$$

flux is 'returning' in a narrow layer of the material and so flux density can be larger in the material than outside it (see FIG. 6). This only happens, however, when $\mu/\mu_o$ is sufficiently high to ensure that $B_x$ is not $<< B_y$ on $x = 0+$. The order of magnitude of the external flux density in the vicinity of the material is $\alpha$. The material does not change this order of magnitude. From (26) the order of magnitude of $B_y$ in the material is $$B_y = \left| \frac{2}{1 + \frac{\gamma_0}{\mu} \frac{}{\alpha}} \right|$$

Therefore the ratio of relative values of flux density in and out of the material is of the order $$\frac{B_{in}}{B_{out}} = \left| \frac{2/\alpha}{1 + \frac{\gamma_0}{\mu} \frac{}{\alpha}} \right| = \frac{2}{\frac{\alpha \delta_s}{((\alpha\delta_s)^4 + 4)^{1/4} +} + \frac{\gamma_0}{\mu}} \quad (28)$$

This is large when $\sigma_s << s/\alpha$ and $\mu >> \mu_o$.

Figure 7:
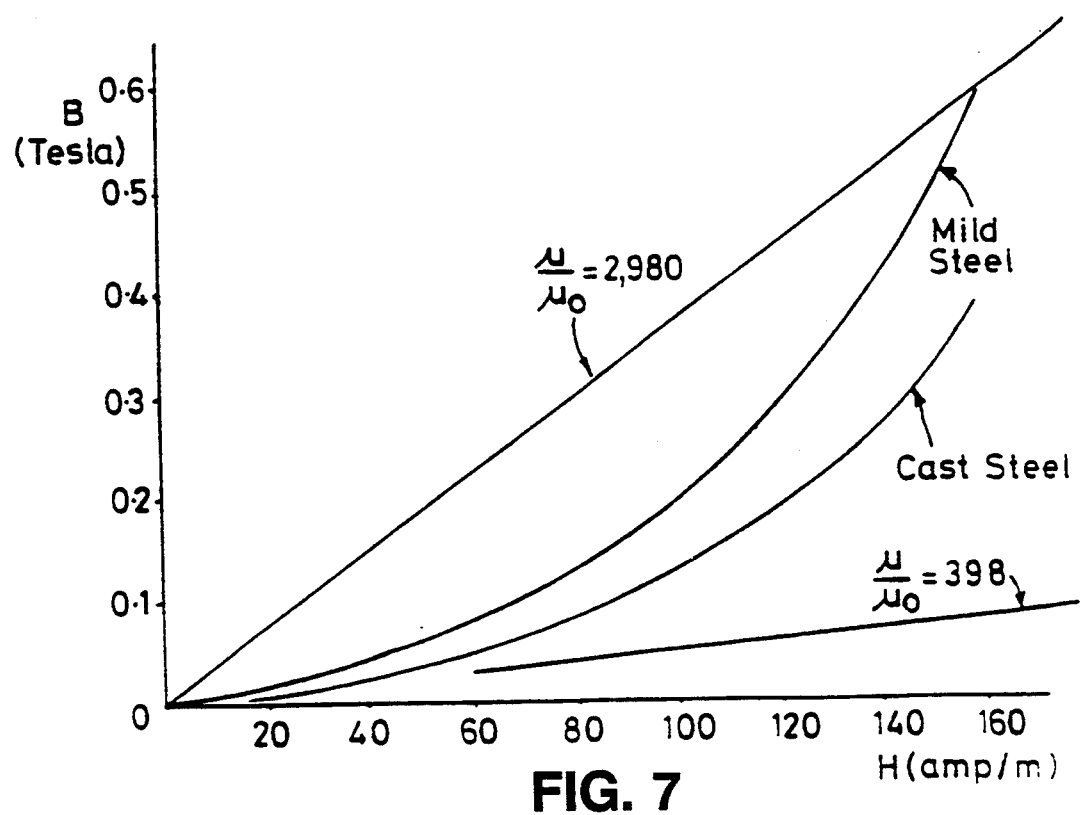
FIG. 7 is an explanatory graph.

The result (28) is important in the flowmeter problem for determining the correct value to use for $\mu$. The B versus H characteristic in materials containing iron is not linear. For mild steel and cast steel, for example, We have the characteristics shown in FIG. 7. The 'correct' value for $\mu$ in these orders of magnitude estimates therefore depends on the flux density in the material. In Tables 1 and 2 we have assumed $\mu/\mu_o = 800$. This amounts to assuming that flux density in mild or cast steel is somewhere around 0.1T. To see that this assumption is valid consider a 100 mm (4") diameter flow tube. The flux density in the main field is $\sim 0.01$T.

The flux density at the ends of the flow tube will be much less; 0.001T at most. Using (28) with $1/\alpha = 50$ mm. $\sigma_s = 1$ mm and $\mu/\mu_o = 800$ we find $|B_{in}| \sim 94 \times 0.001 = 0.094$T in agreement with the original assumption. Since, in (28) the term $\mu_o/\mu$ is negligible, similar remarks hold for all other flow tube sizes.

The E field is given by $\underline{E} = i\omega\underline{A} + \nabla\phi$ where $\underline{B} = \nabla \times \underline{A}$. In the 2-D problem considered here we have $(\underline{A})_x = 0$. On the inside surface of the tube $\partial\phi/\partial x = 0$ on $x = 0$ — so by $\nabla^2\phi = 0$, $\phi = 0$ for $x < 0$. Thus $\underline{E} = i\omega \underline{W} + \nabla\phi$ gives $$E_z = i\omega A$$

and so it can be shown that $$E_z \bigg|_{x=0-} = i\omega \frac{2\sin\alpha y}{1 + \frac{\gamma_0}{\mu} \frac{}{\alpha}} \quad (29)$$

It is of some interest to see how this compares with the estimate (21). First let B be the order of magnitude of the external field in the vicinity of the body. This is $\alpha$, therefore for an external field B (29) gives $$E_z \bigg|_{x=0-} = i\omega B \frac{1}{\alpha} \frac{2\sin\alpha y}{1 + \frac{\gamma_0}{\mu} \frac{}{\alpha}} \quad (30)$$

Now $1/\alpha$ is the characteristic dimension of the B field and is equivalent to b in (21). Using (23) the factor $$F = \left| \frac{2\sin\alpha y}{1 + \frac{\gamma_0}{\mu} \frac{}{\alpha}} \right| = \frac{R_1}{1 + R_1} \quad (31)$$

can differ from 1 only when $R_1 << 1$. F is then $<< 1$. This can happen, when, for example, $\omega \to \infty$ or $1/\alpha \to \infty$ and corresponds to the situation where, by (23), the normal component of $\underline{B}$ at the surface of the conductor is $<<$ the tangential component. Physically $\underline{B}$ is excluded from the conductor so that the induced $\underline{E}$ field (in the conductor falls.

From Table 2 we see that in the electromagnetic flowmeter situation, F is generally of order 1 for adjoining steel pipes other than stainless. For stainless steel or copper pipes R can be $<<1$ especially in the larger flow tubes and at the higher frequencies. The estimate (21) is therefore a worst case, i.e. it may overstate the strength of $E_z'$ in the wall in certain cases.

We consider the worst case as far as adjoining tube material, flow tube size and frequency are concerned. That is, we assume the secondary magnetic field due to eddy currents in adjoining pipe is $<<$ the primary field. Such is the case, for example, with stainless steel adjoining pipes in a 100 mm flowtube working at 60 Hz. To make a fair comparison with the $E_z$ field calculated in relation to (20) we assume the idealised magnet as used in that section. The problem is therefore to find $E_z'$ in a conducting pipe situated in the field of FIGS. 4a and 4b (see FIG. 8). Note we neglect the effect of flanges.

Since the pipe wall thickness is $<<b$ we can treat it as infinitely thin without altering the conditions of the problem. We use the far field of the magnet for which the magnetic potential is a simplified function F (Y, Θ, z).

By using the equations for the $\underline{E}$ field in the pipe including the term $\nabla\phi$ such that $\nabla^2\phi = 0$ it is possible to obtain an equation giving $E_z'$. Hence an expression is obtained for the ratio $R_2$ of the maximum values of the z component of electric fields in the adjoining pipe and in the liquid near the ends of the meter. Thus $$R_2 = \frac{|E_z'|\max}{|E_z|\max}$$

Figure 8:
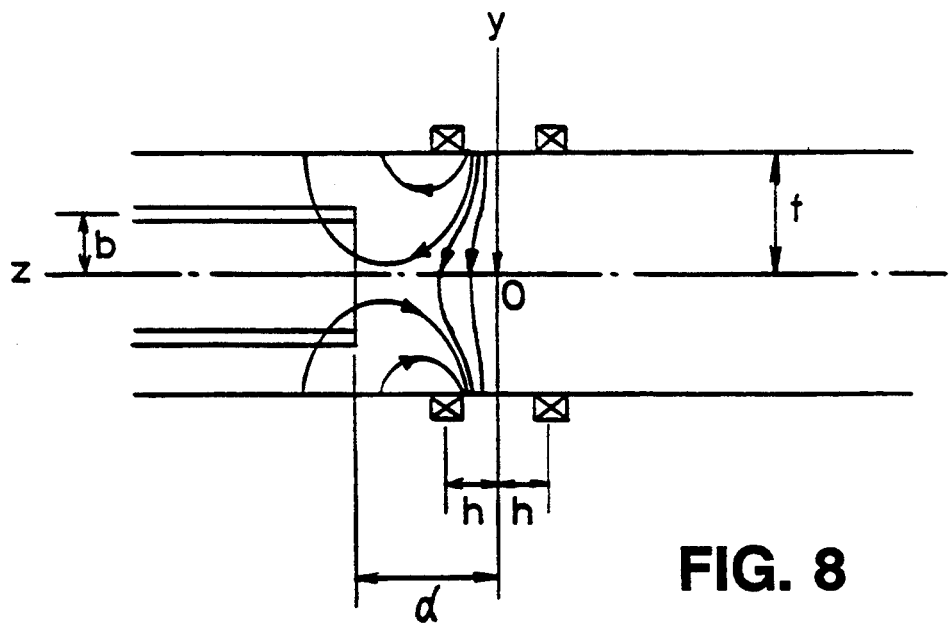
FIG. 8 is a diagrammatic longitudinal section of a portion of a flowmeter.

Referring to the values b, d, f, h as represented in FIG. 8, for realistic values of f/b, d/b and h/f, $R_2$ is quite small (see Tables 3, 4 and 5). This is encouraging for the generality of the self-calibration technique in that the first of the conditions (18) and (19) required for good compensation of virtual current end effects looks likely to be satisfied in practice.

TABLE 3

| d/b | f/b | | | | |
|---|---|---|---|---|---|
| | 1 | 1.2 | 1.3 | 1.4 | 1.5 |
| .75 | .065 | .095 | .094 | .085 | .071 |
| 1 | .039 | .067 | .072 | .068 | .059 |
| 1.25 | .024 | .048 | .054 | .055 | .049 |
| 1.5 | .015 | .034 | .041 | .044 | .041 |
| 1.75 | .009 | .024 | .031 | .035 | .035 |

$R_2$ values for $\frac{h}{f} = 0.6$

TABLE 4

| d/b | f/b | | | | |
|---|---|---|---|---|---|
| | 1 | 1.2 | 1.3 | 1.4 | 1.5 |
| .75 | .084 | .117 | .114 | .101 | .082 |
| 1 | .051 | .084 | .087 | .081 | .068 |
| 1.25 | .031 | .060 | .066 | .065 | .057 |
| 1.5 | .019 | .043 | .050 | .052 | .048 |
| 1.75 | .011 | .030 | .038 | .041 | .040 |

$R_2$ values for $\frac{h}{f} = 0.75$

TABLE 5

| d/b | f/b | | | | |
|---|---|---|---|---|---|
| | 1 | 1.2 | 1.3 | 1.4 | 1.5 |
| 1 | .067 | .105 | .106 | .097 | .080 |
| 1.25 | .041 | .075 | .081 | .077 | .067 |
| 1.25 | .025 | .053 | .061 | .062 | .056 |
| 1.75 | .015 | .038 | .046 | .049 | .047 |

$R_2$ values for $\frac{h}{f} = 0.9$

Figure 9B:
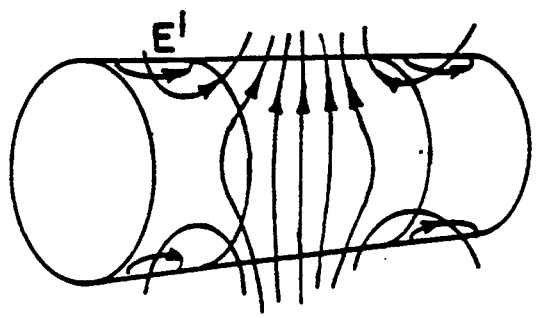

The physical reason for the small values of $R_2$ is, it seems, as follows. The E field in the liquid circulates around a loop through which passes flux from the main magnetic field in the flow tube (FIG. 9(a)). The E field in an adjoining pipe, however, circulates around a loop through which passes flux from the fringe magnetic field (FIG. 9(b)). Thus the central magnetic flux contributes to E in the liquid at the ends of flow tube but not to E' in the adjoining pipes.

Figure 10A:
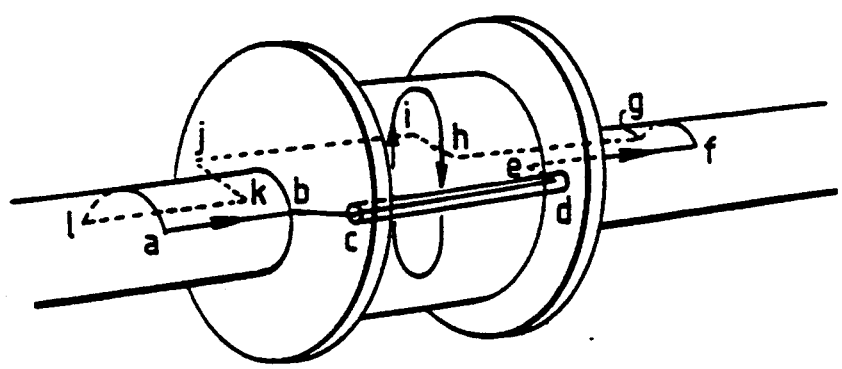
FIGS. 10a and 10b are perspective external views of flowmeters.
Figure 10B:
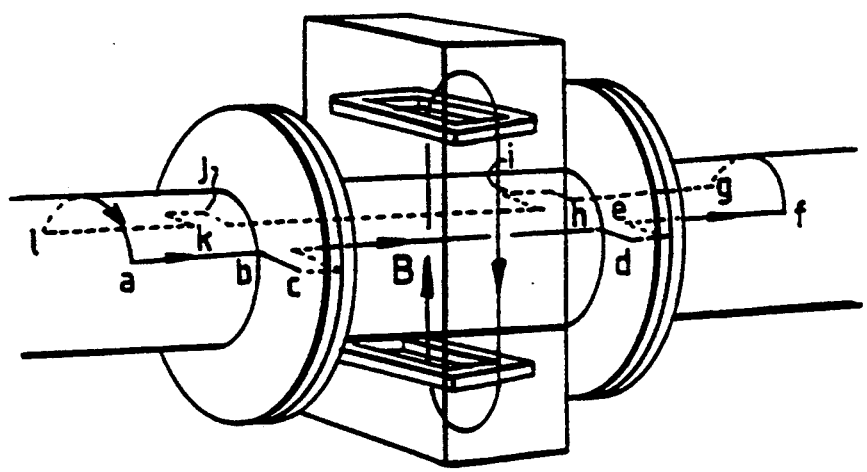

There is a difference between wafer and flanged flow tubes as far as the likely value of E' (the electric field in adjoining pipes) is concerned. Consider a closed loop abcdefghijkl in the metal structure consisting of adjoining pipes, flanges, bolts and (in the flanged tube) the stainless steel tube (FIG. 10(a) and (b)). In the wafer design (FIG. 10(a)) the main magnetic flux returns within the loop and so does not contribute to the total flux through the loop. In the flanged design (FIG. 10(b)), however the main flux returns in the electrical steel which lies outside the loop and so the main flux does appear to contribute to the E' field in the adjoining pipes. To avoid this flux linkage in the flanged design it is desirable to insulate the flanges of the flow tube from those of the adjoining pipes, though the small contacting area and the contact resistance between bolts and flanges may on its own provide sufficient insulation. The estimate of $E_z'$ which leads to Tables 3, 4, 5 of $R_2$ values does, of course, assume no contribution to $E_z'$ from the main magnetic flux.

LARGE AREA NON-CONTACTING ELECTRODES

We now consider the possibility of extending the self-calibration principle to large area contactless electrodes. Contactless electrodes are electrodes separated from the liquid by a thin layer of insulating material. Each such electrode makes contact with the liquid through the capacitance formed between itself and the liquid. Contactless electrodes are not exposed to the fluid and therefore cannot be harmed by it. Large area contactless electrodes result in better averaging over velocity profiles and give rise to reduced turbulent noise signals.

Figure 11:
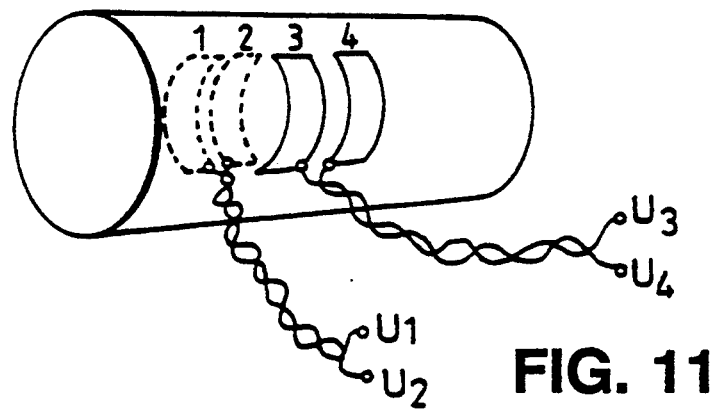
FIGS. 11 and 13 are diagrammatic representations of electrical connections in a flowmeter.

The basic question of interest now is whether or not a flow tube with four extended area contactless electrodes (FIG. 11) works in a self-calibrating fashion. If so this allows self-calibration in flow tubes virtually insensitive to velocity profile effects of any kind.

It is assumed that the basic relation (1) (between the flow induced potential U and eddy field component $E_z$) holds at every point in the liquid. (1) holds, under certain conditions, even if end effects on virtual current are present. The question now, however, is whether relation (5) holds where $U_1$, $U_2$, $U_3$ and $U_4$ are the potentials at the ends of wires connected to the contactless electrodes in FIG. 11 and $\sigma$ is now some effective separation between adjacent electrodes. For point electrodes (5) follows immediately from (1) (given that $\sigma$ is small) because potentials at points in the liquid are measured.

Now, however, the flat profile signal and the eddy current emf between adjacent electrodes must be recalculated and compared.

The flow signal with contactless electrodes is related to the mean value of flow induced potential U over the electrodes. For self-calibration with contactless electrodes we therefore require that the measured emf $\epsilon$ be related to the same mean value of the eddy current $E_z$ field over the electrodes. It will be shown that this is not always the case but that with special laminated electrodes the necessary relation can be obtained.

We will consider a single Fourier component of the fields with frequency $\omega$. However, the main conclusions hold true (by Fourier analysis) for any form of periodic magnetic excitation.

Equations for the flow induced fields are $$\left.\begin{array}{l} \nabla \cdot (j_1 - 1\omega\epsilon E_1) = 0 \\ \nabla \times E_1 = 0 \\ j_1 = 0(E_1 + v \times B) \\ (E_1)_t \\ (j_1 - 1\omega\epsilon E_1)_n \end{array} \text{continuous across internal surfaces} \right\} \quad (32)$$
$$-(E_1)_t = \nabla_d \tau (j_1 - 1\omega\epsilon E_1)_n] \text{ at surface of magnet}$$

where $E_1$ and $j_1$ originate from $v \times B$. Thus $$E_1 = -\nabla U \quad (24)$$

In the liquid U is determined independently of the physical properties of the rest of the external region by $$\nabla^2 U = 0 \quad (34)$$

$$\frac{\partial u}{\partial r} = (v \times B_r) = -vB_\Theta \text{ on liner} \quad (35)$$

$$U + \tau\delta\left(\frac{\partial u}{\partial r} + vB_\Theta\right) = 0 \text{ on adjoining pipes} \quad (36)$$

At the liquid/liner interface the 4th of (32) gives that U is continuous. Therefore to find U in parts of the external region other than the liquid U can be regarded as given on the liner/liquid interface.

Figure 12A:
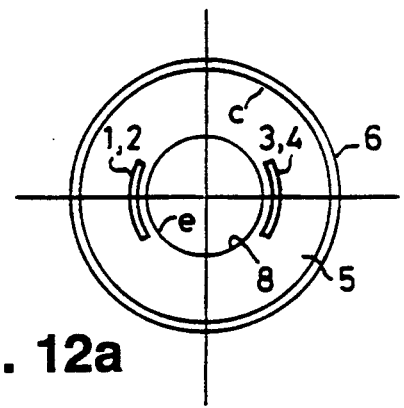
FIGS. 12a and 12b are respectively a cross-section and a longitudinal section of a flowmeter.
Figure 12B:
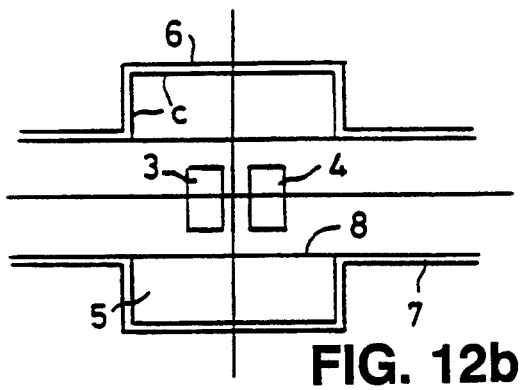
Figure 12C:
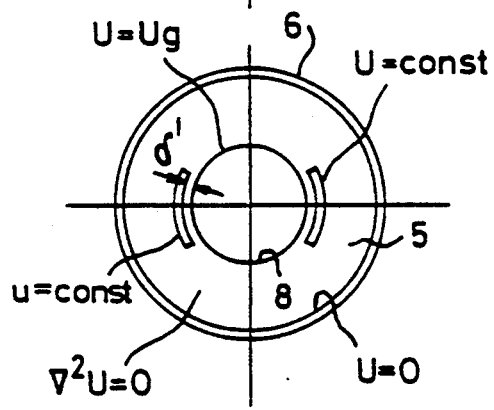
FIGS. 12c and 12d are respectively a cross-section and a longitudinal section of a flowmeter.
Figure 12D:
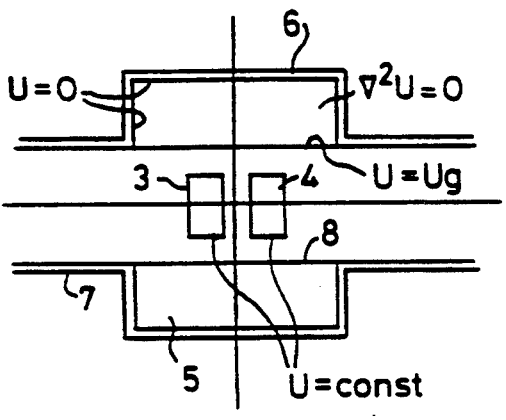

For example, if (as shown in FIGS. 12a and 12b) the liquid/liner interface is e and electrodes 1, 2 and 3, 4 are imbedded in an insulator 5 which is surrounded by a grounded screen c, the boundary value problem for U in the insulator is as shown in FIGS. 12c and 12b, $U_g$ being the value at the wall of the known potential U in the liquid.

If in FIGS. 12a–12d the spacing $\sigma'$ is constant and small over the whole area of each electrode the flow induced potential U on each electrode settles to the mean value of $U_g$ over the electrode area. $U_g$ is here the value at the wall of the known potential U in the liquid. The flow signal $\Delta U$ for a flat profile after phase sensitive detection is therefore $$\Delta U = R\left(\frac{U_1 + U_2}{2} - \frac{U_3 + U_4}{2}\right) \quad (37)$$
$$= R(\overline{U}_{g12} - \overline{U}_{g34})$$

where $\overline{U}_{g12}$ and $\overline{U}_{g34}$ are the mean values of U in the liquid (as determined by (34), (35) and (36)) over the areas of electrodes 1, 2 and 3, 4 respectively, where R(X) means the component of X in phase with the reference.

Figure 13:
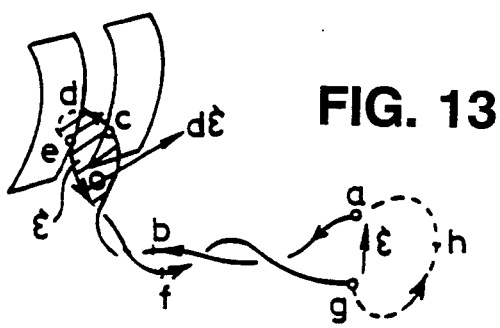

With reference to FIG. 13 the emf $\epsilon$ across the far ends a and g of wires abc and efg connected to adjacent electrodes is found by a direct application of Faraday's Law. We form a closed loop abcdefgha (FIGS. 13 and 18) and obtain $$E \cdot dl = \int_\epsilon 1\omega B \cdot d\epsilon$$

where $\epsilon$ is the area of the surface bounded by the loop or rather the part of that surface in the magnetic field. But $$\int_{gha} E \cdot dl = U_g - U_a = -\epsilon$$

and $\underline{E}$ in the wires is zero (assuming very thin wires), therefore $$\epsilon = \int_{cde} E \cdot dl - \int_\epsilon 1\omega B \cdot d\epsilon \quad (38)$$

Therefore to find $\epsilon$ we need to know the integral of $\epsilon$ along some line joining the junctions e and c on the electrodes and the flux of $\underline{B}$ through a surface bounded by this line and the wires.

In the liquid $\sigma >> \omega\epsilon$ and $\underline{E}'$ is assumed negligible so $\underline{E}$ is determined by the equations $$\left.\begin{array}{l} \nabla \cdot E = 0 \\ \nabla \times E = 1\omega B \\ (E)_n = 0 \text{ on liner} \\ -(E)_t = \nabla_t[\tau_0(E)_n] \text{ on adjoining pipes} \end{array}\right\} \quad (39)$$

independently of the physical properties of the rest of the external region.

At the liquid/liner interface $(\underline{E})_t$ is continuous. Therefore in finding $\underline{E}$ in parts of the external region other than the liquid we can regard $(\underline{E})_t$ as given on the liner/liquid interface. Similarly in other highly conducting parts (e.g. the electrodes) $\underline{E}$ is determined by the equations $$\left.\begin{array}{l} \nabla \cdot E = 0 \\ \nabla \times E = 1\omega B \\ (E)_n = 0 \text{ on surface of the conductor} \end{array}\right\} \quad (40)$$

independently of the properties of the rest of the external region. Therefore $\underline{E}$ can be worked out first in each conducting part and then in the reminder of the external region using the known value of $(\underline{E})_t$ on the surface of the conductors. Note that to work out $\underline{E}$ in the non-conducting part of the external region we need also information regarding the total current passing in or out of the electrodes via the electrode wires.

For example, in the configuration shown in FIGS. 12a and 12b the boundary value problem for $\underline{E}$ in the insulator is as indicated in FIGS. 14a and 14b. Zero net current is assumed to pass into each electrode. As a procedure for solving this problem we can star: by finding the field that would be present if the electrodes were absent and then compute the extra field due to the presence of the electrodes.

Let $\underline{E}_e$ denote the $\underline{E}$ field that would be present in the insulator if the electrodes were removed (i.e. replaced by insulator). Let $\underline{E}_i$ denote the $\underline{E}$ field inside an electrode when in position. As noted above $\underline{E}_i$ depends only on the $\underline{B}$ field and electrode geometry. The total field $\underline{E}$ in the insulator may now be written as $$E = E_e - \nabla \phi \quad (41)$$

where $\phi$ satisfies the equation $$\nabla^2 \phi = 0 \quad (42)$$

and the boundary conditions $$\left.\begin{array}{l} \phi = 0 \text{ at the liquid and at the outside screen} \\ -(\nabla\phi)_t = -(E_e)_t + (E_1)_t \text{ on electrodes} \end{array}\right\} \quad (43)$$

Note that the second of (43) determines $\phi$ over an electrode surface only to within an additive constant. This constant can be found from the knowledge of the net current passing into the electrode. Thus if, in the measurement of the potentials at the end of the wires connected to the electrodes, zero current is drawn we have the extra condition $$\int (E_e - \nabla\phi).d\epsilon = 0$$

where the integral is conducted over the whole surface of the electrode. Since $\nabla.\underline{E}_e = 0$ this reduces to $$\int \nabla\phi.d\epsilon = 0 \quad (44)$$

It is clear that when $\phi$ satisfies the above requirements (summarised in FIG. 15) $\underline{E}$, as given by (41) will satisfy the equations and boundary conditions of FIGS. 14a and 14b.

A certain simplification arises when in FIGS. 14a and 14b, $\sigma'$ and electrode thickness are small and uniform.

The z and $\Theta$ components $(E_z)_e$ and $(E_\Theta)_e$ of $\underline{E}_e$ are, in the vicinity of the electrodes, the same as the values at the wall of $E_z$ and $E_{73}$ in the liquid. Let $(E_z)_l$ and $(E_{73})_l$ be these values at the wall in the liquid. In the same vicinity $(E_r)_e$ is however not zero (as $E_r$ is on the liquid side of the wall) but generally the same order of magnitude as $(E_z)_l$ and $(E_\Theta)_l$. Hence the 2nd equation of (43) becomes (with respect to coordinates in FIGS. 14a and 14b)

$$\left.\begin{aligned}-\frac{\partial \phi}{\partial z} &= -(E_z)_l + (E_z)_1 \\ -\frac{\partial \phi}{b\partial \Theta} &= -(E_\Theta)_l + (E_\Theta)_1\end{aligned}\right\} \text{on electrodes} \quad (45)$$

Since $\sigma'$ is small compared with the characteristic distance of the variation of $\phi$ over an electrode and since $\phi=0$ at the liquid, then on the liquid side of an electrode $(\nabla\phi)_n$ may be replaced by $\phi/\sigma'$. Since $\sigma'$ is assumed $<<$ distances separating the other side of an electrode from the screen, $(\nabla\phi)_n$ is relatively small on the other side. Thus (44) becomes $$\iint \phi \, d\Theta dz = 0 \quad (46)$$

where the integral is carried out over the whole electrode (now a simple surface).

Since the electrodes are thin the eddy currents in them are driven by the components $B_r$ of $\underline{B}$ and the equations for $(E_z)_i$ and $(E_\Theta)_i$ are $$\left.\begin{aligned}\frac{1}{b}\frac{\partial}{\partial\Theta}(E_z)_1 - \frac{\partial (E_\Theta)_1}{\partial z} &= 1\omega B_r \\ \frac{1}{b}\frac{\partial}{\partial\Theta}(E_\Theta)_1 + \frac{\partial (E_z)_1}{dz} &= 0 \\ (E_z)_1 \text{ or } (E_\Theta)_1 = 0 \text{ on edges of the} \\ \text{rectangular electrodes}\end{aligned}\right\} \quad (47)$$

In principle therefore we can first solve (47) for $(E_z)_i$ and $(E_\Theta)_i$, then find $\phi$ on each electrode using (45) and (46), then find $\phi$ in the vicinity of each electrode using (42), the first of (43) and the known value of $\phi$ on each electrode, then find $\underline{E}$ using (41) and finally find $\epsilon$ using (38). However in important cases the calculation of $\phi$ on the electrodes is sufficient to find $\epsilon$.

Figure 16B:
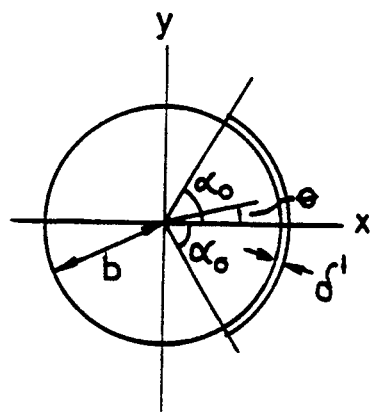
FIGS. 16a, 16b, 17a and 17b show front and side elevations of an arrangement of two electrodes.
Figure 16A:
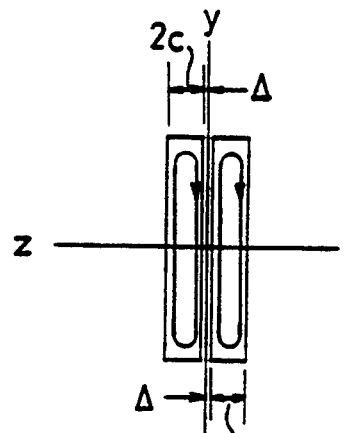

A simple example of the application of the equations (45), (46), (47) to determine $\epsilon$ is the case of a pair of strip electrodes (FIGS. 16a and 16b). Here the width $2c$ of each electrode is assumed $<<$ the tube radius b while the half angle $\alpha$ o subtended by each electrode is assumed not to be small (i.e. $\alpha_0 b$ is of the same order as b). Also the separation $\Delta$ between the adjacent electrodes is assumed $<<2c$ and the thickness $\sigma$ of the insulating layer is assumed $<<c$. Summarising, the assumptions are $$\left.\begin{aligned}2c &<< b \\ \alpha_0 &\approx 1 \text{ radian} \\ \Delta &<< c \\ \sigma' &<< c\end{aligned}\right\} \quad (48)$$

Under conditions (48) the equations of (45), (46), (47) are applicable and have a simple solution.

Except near the ends of the electrodes the eddy currents are mainly in the $\Theta$ direction (FIGS. 16a and 16b). (47) gives $$-\frac{\partial(E_\Theta)_1}{\partial z} = 1\omega Br \quad$$

Since $B_r$ is effectively independent of z across the short distance $2c$ this integrates to give $$(E_\Theta)_1 = -1\omega B_r(z+C) \quad (49)$$

where the constant C must be $-(c+\Delta)$ and $(c+\Delta)$ for the L.H. and R.H. electrode in FIG. 16(a) respectively. This value of C ensures that the total eddy current along each strip electrode is zero. Note that, because they are close, the eddy current patterns and $(E_\Theta)_i$ are identical in each electrode.

Except near the ends of the electrodes equations (45) are thus $$\left.\begin{aligned}-\frac{\partial \phi}{\partial z} &= -(E_z)_l \\ -\frac{\partial \phi}{b\partial \Theta} &= -(E_\Theta)_l - 1\omega B_r(z+C)\end{aligned}\right\} \quad (50)$$

In (50) we may regard $$\left.\begin{aligned}B_r &= \text{function of } \Theta \text{ only} \\ (E_z)_l &= \text{function of } \Theta \text{ only} \\ (E_\Theta)_l &= (E_\Theta)_{l z=-C} + \left[\frac{\partial(E_\Theta)_l}{\partial z}\right]_{z=0}(z+C)\end{aligned}\right\} \quad (51)$$

Thus $(E_\Theta)_l$ can be assumed to depend on z only linearly. Equations (50) are then a consistent pair in that $(1/b)\partial/\partial\Theta$ of the first equals $\partial/\partial z$ of the second on account of the fact that $$\frac{1}{b}\frac{\partial(E_z)_l}{\partial\Theta} - \frac{\partial(E_\Theta)_l}{\partial z} = 1\omega B_r \quad (52)$$

which is the r component of the 2nd of (39) at the wall.

The 1st of (50) gives $$\Phi = (E_z)_l(z+C) + f(\Theta) \quad (53)$$

The constant $C = \mp(c+\Delta)$ is included in (53) for convenience. Substitution of (53) in the 2nd of (50) and use of the 2nd of (51) gives $$-\frac{1}{b}\left[\frac{\partial(E_z)_l}{\partial\Theta}(z+C) + f^1(\Theta)\right] =$$

$$-(E_O)_{lz=-C} - \left[\frac{\partial(E_\Theta)_l}{\partial z}\right]_{z=0}(z+C) - 1\omega B_r(z+C)$$

which on account of (52) reduces to $$-\frac{1}{b}f^1(\Theta) = -(E_\Theta)_{lz=-C}$$

Hence $$f(\Theta) = b\int_O^\Theta (E_\Theta)_{lz=-C}d\Theta + C^1$$

The constant $C'$ can be found from the requirement (46). Substituting (50) into (43) gives $$\int_{-\alpha}^{\alpha} f(\Theta) d\Theta = 0 \tag{54}$$

so $$C^1 = -\frac{b}{2\alpha} \int_{-\alpha_O}^{\alpha_O} \left[ \int_{O}^{\Theta} (E_\Theta)_{l z = -c} d\Theta \right] d\Theta \tag{55}$$

We therefore have for $\phi$ on the electrodes the expression $$\phi(\Theta,z) = (E_z)_l(z + C) + b\int_{O}^{\Theta} (E_\Theta)_{lz=-c} d\Theta + C^1 \tag{56}$$

Figure 17B:
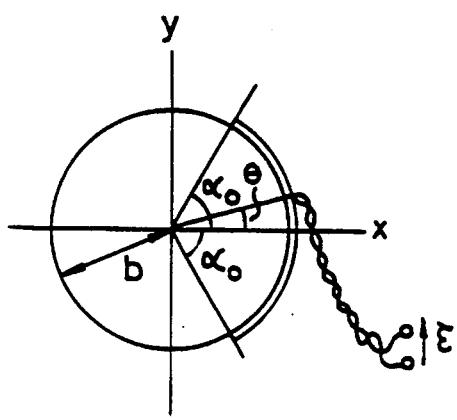
Figure 17A:
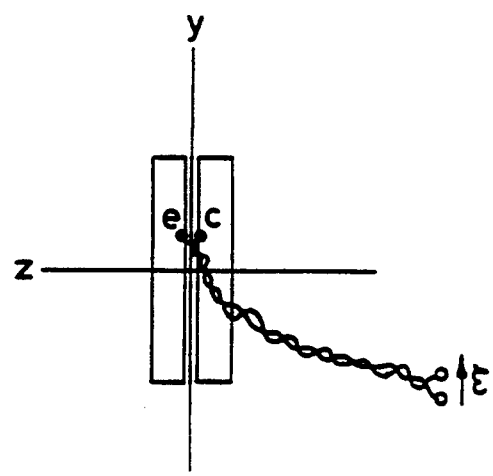
Figure 18:
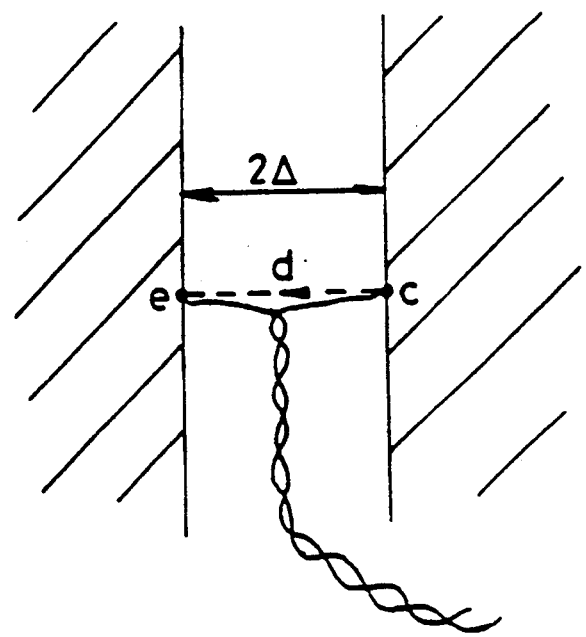
FIG. 18 is a diagram of portions of two Juxtaposed electrodes.

If wires are connected to the electrodes as shown in FIGS. 17a and 17b we can apply (38) and obtain a result for $\epsilon$. We choose the line cde to be a straight line parallel to the z axis (FIG. 18). Now by (41) $\underline{E}$ in (38) is given by $$E = E_e = \nabla\phi$$

The integral $$\int_{cde} E_e \cdot dl \to 0 \text{ for } \Delta \to 0$$

but the integral $$-\int_{cde} \nabla\phi \cdot dl = \phi_c - \phi_e$$

remains the same for $\Delta \to 0$. Clearly the area offered to the magnetic flux in the loop in FIG. 18 can be assumed zero. Hence $$\epsilon = \Phi_t - \Phi_2$$

Now $$\Phi_t - \Phi_2 = \Phi(\Theta_1 - \Delta) - \Phi(\Theta_1 \Delta)$$

where $\phi(\Theta,z)$ is given by (56). Using (56) and (55) we thus find $$\epsilon = \phi_c - \phi_e$$

$$= (E_z)c + b\int_{O}^{\Theta}(E_\Theta)_{lz=-C-\Delta}d\Theta -$$

$$\frac{b}{2\alpha}\int_{-\alpha_O}^{\alpha_O}\int_{0}^{\Theta}(E_\Theta)_{lz=-C-\Delta}d\Theta d\Theta -$$

$$\left[ (E_z)(-c) + b\int_{0}^{\Theta}(E_\Theta)_{lz=c+\Delta}d\Theta - \right.$$

$$\left. \frac{b}{2\alpha}\int_{-\alpha_O}^{\alpha_O}\int_{0}^{\Theta}(E_\Theta)_{lz=c+\Delta}d\Theta d\Theta \right]$$

or finally $$\epsilon = 2c(E_z)_l - \tag{57}$$

$$2cb\int_{0}^{\Theta}\frac{\partial(E_\Theta)_l}{\partial z}\bigg|_{z=0}d\Theta + \frac{2cb}{2\alpha}\int_{-\alpha_O}^{\alpha_O}\int_{0}^{\Theta}\frac{\partial(E_\Theta)_l}{\partial z}\bigg|_{z=0}d\Theta d\Theta$$

Figure 19:
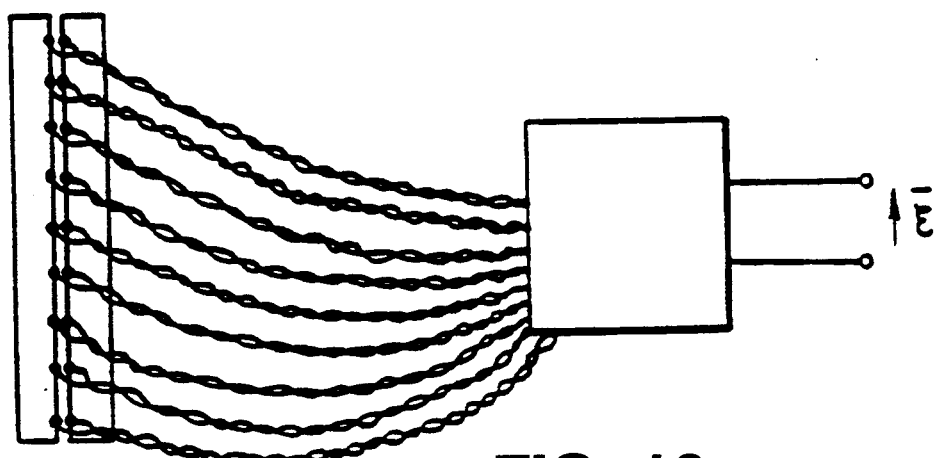
FIG. 19 is a diagram of a further arrangement of two juxtaposed electrodes.

The result (57) shows that in the configuration of FIG. 17 the emf $\epsilon$ is related to the value of $E_z$ in the liquid directly in front of the point chosen to connect the ends c and e of the wires to the electrodes (first term in (57)). It is also related to the derivative $\partial (E_\Theta)_l/\partial z$ on $z=0$ over a range of angles (second term in (57)). The configuration in FIG. 17 therefore does not satisfy the condition necessary for self-calibration. The necessary condition could be obtained, at the cost of extra wires and electronic components by measuring $\epsilon$ at many places along the electrodes and averaging the results (FIG. 19). This amounts to forming the integral $$\int_{-\alpha_O}^{\alpha_O} \epsilon d\Theta/2\alpha$$

In doing this only the first term on the R.H.S. of (57) remains and we obtain the required relation $$\epsilon = 2c\overline{(E_z)_l}$$

where the bar denotes mean value over the range $-\alpha_o < \Theta < \alpha_o$.

The reason that the configuration in FIGS. 17a and 17b fails to give $\epsilon$ proportional to the mean value of $(E_z)_l$ over the electrodes is clearly related to the fact that $\epsilon$ depends on the angular position $\Theta$ chosen to fix the wires. This dependence on $\Theta$ is in turn due to the presence of $(E_\Theta)_i$ in the electrodes. To see this consider the second of (45), i.e.

$$-\frac{\partial\phi}{b\partial\Theta} = -(E_\Theta)_l + (E_\Theta)_1$$

This gives for the difference in $\epsilon$ for $\Theta=0$ and $\Theta=\Phi_1$.

$$\epsilon_O - \epsilon_1 = (\phi_c - \Theta_e)_{\Theta=0} - (\phi_c - \Theta_e)_{\Theta=\Theta_1}$$
$$= (\phi_c)_{\Theta=0} - (\phi_c)_{\Theta=\Theta_1} - ((\phi_e)_{\Theta=0} - (\phi_e)_{\Theta=\Theta_1})$$

$$= \int_{0}^{\Theta_1}((-E_\Theta)_l + (E_\Theta)_1)bde\bigg|_{z=-\Delta} -$$

$$\int_{0}^{\Theta_1}((-E_\Theta)_l + (E_\Theta)_1)bde\bigg|_{z=\Delta}$$

Since $\Delta$ is small $(E_\Theta)_l |_{z=-\Delta}$ and $(E_\Theta)_l |_{z=\Delta}$ are the same and this reduces to $$\epsilon_0 - \epsilon_1 = \int_{0}^{\Theta_1}((E_\Theta)_1 |_{z=-\Delta} - (E_\Theta)_l + |_{z=\Delta})bde$$

Figure 20A:
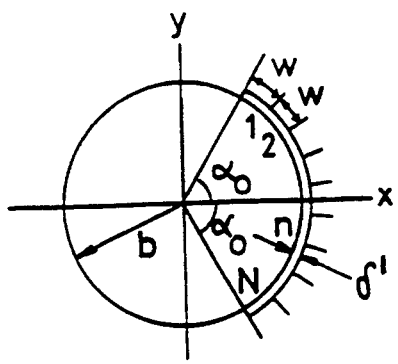
Figure 20B:
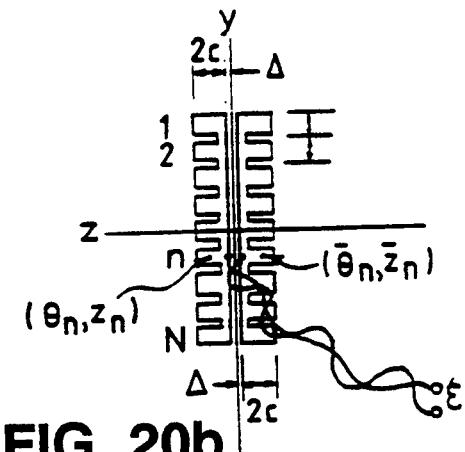

Thus if $(E_\Theta)_i$ was zero, $\epsilon$ would be independent of $\Theta$. Now the order of magnitude of $(E_\Theta)_i$ does $\to 0$ as $c \to 0$ (see (49)) but the value of $\epsilon$ itself then also goes to zero at the same rate (see (57)). Therefore the problem is not resolved by further reduction of the width of the electrodes. We need some other way to reduce $(E_\Theta)_i$. One way is to cut slots in the electrodes (FIGS. 20a and 20b)

so as to prevent eddy currents flowing in the G direction but so as to retain the connection between the various parts on the edges $z=\pm\Delta$. We now study this multi-slotted configuration.

The electrodes in FIGS. 20$a$ and 20$b$ are supposed to be identical to those in FIG. 16 (except for the narrow slots ending close to the inner electrode edges) and the conditions (48) are assumed. The width w of each continuous part of an electrode is assumed to be $<<c$.

The smallness of each continuous part of the electrodes results in negligible eddy currents. Therefore in the general equation (45) $(E_z)_i$ and $(E_\Theta)_i$ can be put equal to zero. Also $(E_z)_l$ and $(E_\Theta)_l$ are effectively constant over each continuous part. Thus by (45) we have over the nth part of the LH electrode $$\phi_n(\Theta,z) = (E_z)_l(z-z_n) + b(E_\Theta)_l(\Theta - \Theta_n) + C_n \quad (58)$$

where $(\Theta_n, z_n)$ are the coordinates of the centre of the nth part and $C_n$ is a constant. Similarly on the RH electrode the potential is $$\phi_n(\Theta,z) = (E_z)_l(z-\bar{z}_n) + b(E_\Theta)_l(\Theta - \bar{\Theta}_n) + \bar{C}_n \quad (59)$$

where $(\bar{\Theta}_n, \bar{z}_n)$ are the coordinates of the centre of the nth part of the RH electrode. Since the electrodes are close and narrow $(c<<b)$, $(E_z)_l$ and $(E_\Theta)_l$ are the same in (59) as they are in (58). Condition (46) applied to (58) and (59) now gives $$\left.\begin{array}{l}\sum_{n=1}^{N} C_n = 0 \\ \sum_{n=1}^{N} \bar{C}_n = 0\end{array}\right\} \quad (60)$$

where the sum is carried out over all the N parts.

As shown in FIGS. 20$a$ and 20$b$ let the electrode wires be connected at $(\Theta,\Delta)$ and $(\Theta, -\Delta)$. The measured emf $\epsilon$ is independent of $\Theta$ for $-\alpha_o < \Theta < \delta_o$ (the value of $(E_\Theta)_i$ now being negligible). On the other hand using (58) and (59) when the wires are on the nth parts (as in FIGS. 20$a$ and 20$b$) the emf is $$\begin{aligned}\epsilon_n &= \phi_1(\Theta_i - \Delta) - \phi_n(\Theta, \Delta) \\ &= (E_z)_l(-\Delta - z_n) + b(E_\Theta)_l(\Theta - \Theta_n) + C_n - \\ &\quad [(E_z)_l(\Delta - \bar{z}_n) + b(E_\Theta)_l(\Theta - \bar{\Theta}_n) + \bar{C}_n]\end{aligned}$$

Since $z_n = \Delta + C$ and $\bar{z}_n = -\Delta - C$ and since $\Theta_n = \bar{\Theta}_n$ we find $$\epsilon_n = 2(E_z)_l c + C_n + \bar{C}_n$$

Since $\epsilon_n$ is independent of n we can sum this to obtain for the emf $\epsilon$ measured at any point $\Theta$ $$\epsilon = \frac{1}{N}\sum_{n=1}^{N}\epsilon_n = 2c(E_z)_l + \frac{1}{N}\sum_{n=1}^{N} C_n + \frac{1}{N}\sum_{n=1}^{N}\bar{C}_n$$

On account of (60) we have finally $$\epsilon = 2c(E_z)_l \quad (61)$$

as expected.

For completeness we note that the constants $C_n$ and $\bar{C}_n$ can be found from the requirement that the second of (45), with $(E_\Theta)_i = 0$ must hold on $z=\pm\Delta$. Thus for the LH electrode (58) gives for the nth part $$\phi_n(\Theta,\Delta) = -c(E_z)_l + b(E_\Theta)_l(\Theta - \Theta_n) + C_n \quad (62)$$

This is satisfied within each part but it must also be satisfied overall from part to part. This requires $$\frac{\phi_n(\Theta_n,\Delta) - \phi_{n=1}(\Theta_{n+1}\Delta)}{w} = ((E_\Theta)_l)_{\Theta=\Theta_n} \quad (63)$$

Substituting (62) in (63) gives the relation $$C_{n+1} = C_n + c[((E_z)_l)_{\Theta=\Theta_{n+1}} - ((E_z)_l)_{\Theta=\Theta_n}] - \omega \cdot ((E_\Theta)_l)_{\Theta=\Theta_n}$$

which together with $$\sum_{n=1}^{N} C_n = 0$$

fixes the $C_n$ in terms of $(E_z)_l$ and $(E_\Theta)_l$.

(61) is, of course, exactly the relation we require for self-calibration. The configuration of FIGS. 20$a$ and 20$b$ under the conditions stated above therefore provides an extension of self-calibration to wide angle electrodes. Note that the effective separation of the electrodes in measuring $\epsilon$ is 2c. It is natural now to investigate the possibility of extending the electrodes over a larger area (i.e. dropping the condition $2c<<b$). As the first step in this direction we consider a pair of strip electrodes of length 2c comparable to b.

We consider the configuration in FIGS. 21$a$ and 21$b$ under the conditions $$\left.\begin{array}{l}w << b \\ \Delta << b \\ \delta^1 << w\end{array}\right\} \quad (64)$$

Over the electrodes we regard $B_r$ = function of z only
$(E_\Theta)_l = 0$ $(E_z)_l = (E_z)_{l\Theta=0} + \left.\frac{\partial(E_z)_l}{\partial\Theta}\right|_{\Theta=0} \Theta$ $(E_\Theta)_l$ = function of z only The argument is now similar to that for adjacent strip electrodes and we have $$(E_z)_l = l\omega B_r \Theta b$$

so that on the electrodes $$\left.\begin{array}{l}\dfrac{\partial\phi}{\partial z} = (E_z)_{l\Theta=0} + \left.\dfrac{\partial(E_z)_l}{\partial\Theta}\right|_{\Theta=0}\Theta - l\omega B_r \Theta b \\ \\ \dfrac{\partial\phi}{b\partial\Theta} = (E_\Theta)_l\end{array}\right\}$$

Hence

Figure 21A:
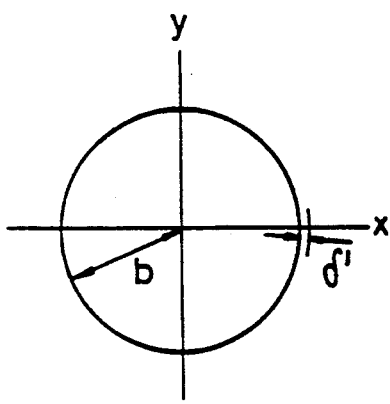
Figure 21B:
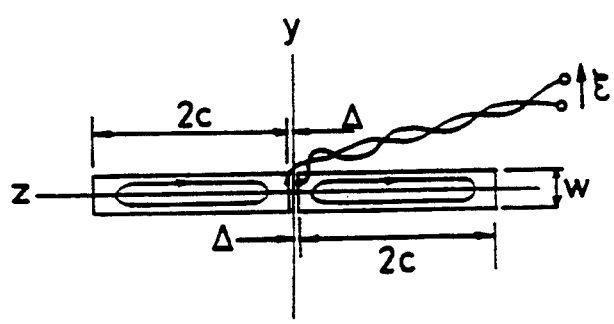

-continued $$\Theta_\pm = b\Theta\,(E_\Theta)_I + \int_{\pm\Delta}^{Z} (E_Z)_I \bigg|_{\Theta=0} dz + C_\pm$$

where $\pm$ refers to the LH and RH electrodes in FIGS. 21a and 21b respectively. Condition (46) gives $$C_\pm = \mp \frac{1}{2c} \int_{\pm\Delta}^{\pm(\Delta+2c)} \left( \int_{\pm\Delta}^{Z} (E_Z)_I \bigg|_{\Theta=0} dz \right) dz$$

With wires connected as shown in FIGS. 21a and 21b $$\begin{aligned}
\epsilon &= \phi_-(\Theta_j - \Delta) - \phi_+(\Theta,\Delta) \\
&= C_- - C_+ \\
&= \frac{1}{2c}\left( \int_\Delta^{\Delta+2c} \left( \int_\Delta^Z (E_Z)_I \bigg|_{\Theta=0} dz \right) dz + \int_{-\Delta}^{-\Delta-2c} \left( \int_{-\Delta}^Z (E_Z)_I \bigg|_{\Theta=0} dz \right) dz \right)
\end{aligned}$$

Integrating by parts we obtain $$\epsilon = \int_{-2c}^{2c} (E_Z)_I \bigg|_{\Theta=0} dz + \frac{1}{2c} \int_{-2c}^{0} z(E_Z)_I \bigg|_{\Theta=0} dz - \frac{1}{2c} \int_0^{2c} z(E_Z)_I \bigg|_{\Theta=0} dz \quad (65)$$

where $\Delta$ has been put equal to zero on account of its smallness.

Unfortunately (65) does not generally give the required average of $(E_z)_I$ over the electrode length. It does do so if $(E_z)_I$ is a linear function of $z$ (or a constant plus a series of odd powers of $z$) over the electrodes. Then, for the terms in $z$, $z^3$, $z^5$ ... cancellation occurs in the integrals in (65) and only the (constant) first term in the series need be considered. As a result we then get as required $$\epsilon = 2c(E_z)_I$$

In general, however, this is not so. Removing $(E_z)_i$ (by e.g. slotting in the $\Theta$ direction) does not overcome the problem; equation (62) remains unchanged.

Returning to the configuration of FIGS. 20a and 20b we consider the problem of finding $\epsilon$ under the relaxed condition ($2c$ no longer $<<b$). Clearly the property of perfect averaging in $\Theta$ will hold true in this case. A full treatment gives, as we would expect $$\epsilon = \frac{1}{N} \sum_{n+1}^{N} \left[ \int_{-2c}^{2c} (E_Z)_I \bigg|_{\Theta=\Theta_n} dz + \frac{1}{2c} \int_{-2c}^{0} z(E_Z)_I \bigg|_{\Theta=\Theta_n} dz - \frac{1}{2c} \int_0^{2c} z(E_Z)_I \bigg|_{\Theta=\Theta_n} dz \right] \quad (66)$$

This suffers from the same defect as (65), i.e. averaging of $(E_z)_I$ in $z$ is not properly achieved.

Figure 22A:
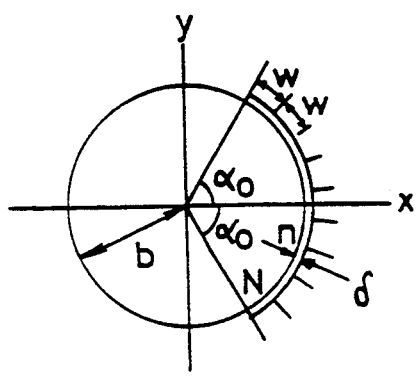
Figure 22B:
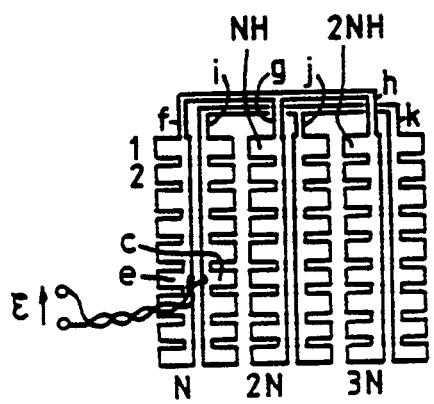

We consider now an electrode design which achieves correct averaging of $(E_z)_I$ over a large area. The configuration is illustrated in FIGS. 22a and 22b. It consists of identical pairs of multi-slotted electrodes each conforming to the design in FIGS. 20a and 20b under the conditions (48). For simplicity only three pairs are drawn in FIG. 22 but any number could be present. The LH sides of every pair are connected by the thin strip fgh and the RH sides of each pair are connected by the thin strip ijk. It is important that the strips fgh and ijk lie close to each other all along their length. The emf $\epsilon$ is measured across the ends of wires connected to adjacent points c and e on any one of the electrode pairs. Let the electrode parts be numbered 1, 2 ... 3N as shown in the figure.

An expression for $\epsilon$ can be obtained in the same way as in (61). Thus $(E_z)_I$ and $(E_\Theta)_I$ can be considered constant over every part of each electrode pair and since $(E_z)_i$ and $(E_\Theta)_i$ are negligible expressions (58) and (59) hold for $\phi$ on the nth part where n now runs from 1 to 3N.

Since the area of the connecting strips fgh and ijk is small the contribution by the strips to the integral in (46) is negligible and we must have $$\sum_{n=1}^{3N} c_n = \sum_{n=1}^{3N} C_n = 0 \quad (67)$$

Note also that $$\epsilon = \Phi_I - \Phi_2$$

Since $(E_\Theta)_i = 0$ over the inner edge of each electrode and since $(E_\Theta)_I$ does not change over the short distance $\Delta$, it follows that $\epsilon$ is the same regardless of where along the inner edges the adjacent points c and e are taken. This argument can be extended by allowing the points c and e to move (always in close proximity to each other) along the connecting strips fgh and ijk to another electrode pair. Summing up over every part we thus have $$\epsilon = \frac{1}{3N} \sum_{n=1}^{3N} \epsilon_n = 2c(E_Z)_I + \frac{1}{3N} \sum_{n=1}^{3N} c_n + \frac{1}{3N} \sum_{n=1}^{3N} C_n$$

and by (67)

$$\epsilon = 2c(E_z)_I$$

where the bar now denotes the mean value of $(E_z)_I$ over the whole area of the electrode.

The configuration in FIG. 22 under the conditions (48) therefore generalises self-calibration to large area electrodes. Note that because of the property of correct averaging of $(E_z)_I$ with strip electrodes long in the flow direction when $(E_z)_I$ is a linear function of $z$ a given area can be covered with fewer electrode pairs than would otherwise be necessary.

Perhaps the most important problem in the practical realisation of self-calibration is the effect of unwanted flux linkage. This arises mainly in connection with flux in the space between the electrode and the liquid.

We have seen that under certain circumstances adjacent contactless electrodes can be used to measure the mean value of $E_z$ over their combined area. When the spacing $\sigma'$ between the electrode and the liquid is infinitely small the $E_z$ field sensed is $(E_z)_l$ (i.e. the z component of the eddy current $\overline{E}$ field in the liquid) as required. However in practice $\sigma'$ has probably to be about 2 mm from liner wear and liner strength requirements. From the $\Theta$ component of the relation $$\nabla \times E = i\omega B$$

we infer that the difference between the $E_z$ field sensed at $r=b+\delta$ and the $(E_z)_l$ field at $r=b$ is $$\sigma E_z = i\omega B_\theta \sigma'$$

On the other hand $$(E_z)_l = i\omega B_c b$$

where $B_c$ is the flux density at the flow tube centre. Hence the fractional error in the $E_z$ field measurement is $$\frac{\delta E_z}{(E_Z)_l} = \frac{\delta'}{b} \frac{B_\Theta}{B_c}$$

Generally $B_\Theta$ is of the same order of magnitude as $B_c$ so, for example, with $o'=2$ mm and $b=50$ mm errors of the order of 4% are likely.

This flux linkage error in $E_z$ measurement causes, of course, a fractional error of the same magnitude in the predicted sensitivity S. We note, however, that this error can be greatly reduced by means of sheets of permalloy (or some other highly permeable material) placed behind the electrodes (FIG. 23). This has the effect of reducing $B_\Theta$ relative to $B_c$. Also unwanted flux linkage from any cause can be largely removed by zeroing the sensitivity measurement in the transmitter while the inner wall of the flow tube is covered with a laminated and non-magnetic metal sheen. The laminated sheet must consist of strips of conductor parallel to the z axis and insulated from each other. This makes $E_z$ (but not $E_\Theta$) negligible on the inner wall.

A PREFERRED EMBODIMENT OF THE INVENTION

An example of the invention wherein small electrodes are used will now be described with reference to FIGS. 26, 3 and 24. The flowmeter sensitivity S (in FIG. 26) is given by $$S = R\left(\frac{U1 - U2}{v}\right) = \frac{1}{\omega} R_\perp(E_1 - E_2) \qquad (68)$$

where $E_1$ and $E_2$ are the z components of $\overline{E}$ in the liquid at the positions occupied by the electrodes (which are assumed to be small). If $E_1$ and $E_2$ can be measured S can be deduced from (68).

Measurement of $E_1$ and $E_2$ can be accomplished using two pairs a, a' and b, b' of closely spaced point electrodes (FIG. 3). The straight line aa' or bb' joining a to a' or b to b' is parallel to the z axis and the mid points of aa' and bb' lie in the positions normally occupied by the electrodes that sense the flow induced potential. The distance $\sigma$ between a and a' or b and b' is small compared with the tube radius.

The emfs $\epsilon_1$ and $\epsilon_2$ across the remote ends of wires connected to each pair of electrodes are proportional to $E_1$ and $E_2$ respectively provided flux linkage with each pair of wires is avoided. Neglecting $\overline{E}_1$ in the electrodes and wires and choosing the contour C so than it passes from a to a' via the shortest path (i.e. parallel to the z axis (see FIG. 24)) we have by Ampere's circuital law $$\epsilon_1 = -E_1 \sigma$$

Similarly $\epsilon_2 = -E_2\sigma$ so that $$S = \frac{1}{\omega\sigma} R_\perp[\epsilon_2 - \epsilon_1] \qquad (69)$$

This is the relation between flowmeter sensitivity and the measured emfs $\epsilon_1$ and $\epsilon_2$.

The relation (69) is independent of the magnetic field and therefore remains true if the magnetic field changes for any reason (in magnitude or in distribution) from the design magnetic field. Continuous measurement of $\epsilon_1$ and $\epsilon_2$ therefore allows continuous readjustment of the value of sensitivity used to convert the flow signal into a reading of flow rate. $\epsilon_1$ and $\epsilon_2$ are virtually independent of flow since the main flow induced potential gradients are generated in the x direction not in the z direction. Also the phase of $\epsilon_1$ and $\epsilon_2$ will in practice be almost 90° removed from that of any flow signal that might be present across a and a' or b and b'. This follows because of the presence of i in the relation between $E_z$ and U which is $$\frac{U}{V} = \frac{E_z}{i\omega} \qquad (70)$$

as in equation (1)

Phase sensitive detection thus has the effect of removing any remaining flow signal across a and a' or b and b'.

It is therefore possible to make a direct measurement of sensitivity whether or not flow is occurring in the meter. This finds application in the calibration of newly manufactured flowmeters using a probe for $E_z$ measurement in water filled meters (without the need for flow) or in the self-calibration of flowmeters working in the field.

An important advantage for short flowmeters of this method of sensitivity measurement is that it automatically corrects for the variation in the magnetic field due to the magnetic properties of pipes adjoining the flowmeter. It also compensates for the shorting effect on flow induced potential of conducting pipes adjoining the flowmeter. This can be shown as follows.

The method of sensitivity measurement depends on the validity of the relation between flow induced potential U and the z component $E_z$ of the eddy current E-field in the liquid. This relation is exact only in a flowmeter with infinitely long insulated tube. If the tube is insulated for a $|z|<d$ but conducting for $|z| \geq d$ as is the case when conducting pipes adjoin the meter, the relation no longer holds generally.

The equations for $E_z$ are now $$\left.\begin{array}{l}\nabla^2 E_Z = 0 \\ \frac{\partial E_Z}{\partial r} = i\omega B_\Theta, r = b, |z| < d \\ E_Z + T_O \left[ \frac{\partial E_Z}{\partial r} - i\omega B_\Theta \right] = E_Z' - OE_r \frac{\partial 1}{\partial 2}, r = h, |z| > d \\ E_Z \to 0 \text{ for } |z| \to \infty \end{array}\right\} \quad (71)$$

where $E_z'$ is the electric field component in the conducting pipes and $\tau$ is the contact impedance.

The equations for flow induced potential U for flat profile flow when conducting pipes are present for $|z| \geq 2d$ are $$\left.\begin{array}{l}\nabla^2 U = 0 \\ \frac{\partial U}{\partial r} = -vB_\Theta, r = b, |z| < d \\ U + T_O \left[ \frac{\partial U}{\partial r} + vB_\Theta \right] = 0, r = b, |z| > d \\ U \to 0 \text{ for } |z| \to \infty \end{array}\right\} \quad (72)$$

Comparing (71) with (72) we see that (70) remains true so long as the right hand side of the third of (71) is zero. This is the case when $\tau$ is a function only of $\Theta$ and $E'_z$ is zero. These conditions may be approximately satisfied in practice in that (a) the absolute (mean) value of $\tau$ may be more significant (for changes in sensitivity) than its variation with $\Theta$ or $z$ and (b) $E'_z$ being due to the fringe magnetic field, may be considerably smaller than $E_z$ which, arises from the main flux. A more detailed study of the relative magnitudes of $E'_z$ and $E_z$ confirms (b) above (see the explanation relating to tables 3, 4 and 5).

In the case of a meter with small electrodes an important relation has been derived above between the flow induced potential and the $z$ component of the eddy current $\overline{E}$-field in the liquid. This relation shows a new method for measuring or monitoring flowmeter sensitivity. The relation can be easily generalised to the case of any periodic excitation of the magnet. Since (70) holds for any frequency $\omega$ we have, for any periodic excitation, the relation $$\frac{1}{v} \frac{\partial U}{\partial t} = -E_Z$$

or $$\frac{U}{v} = - \int E_Z dt$$

from which it follows that sensitivity is given in terms of a time integral of the values $E_1$ and $E_2$ of $E_z$ at electrodes 1 and 2 in FIG. 26 which can be measured in the way described above. Sensitivity measurement based on eddy current $\overline{E}$-field sensing is therefore possible with any kind of periodic magnet excitation and is not restricted to the sinewave case. It provides a method for self-calibration of electromagnetic flowmeters in the field providing automatic compensation for any variation in the magnetic field and partial compensation for changes in contact impedance of pipes adjoining the flowmeter.

A further development of the invention is shown in FIG. 25 and consists of an 8-electrode configuration which reduces velocity profile errors (independently of self-calibration) while retaining the self-calibration function. In this case the flow signal $\Delta U$ on which the flow measurement is based is $$\Delta U = R \left[ \frac{U_1 + U_2}{2} - \frac{U_3 + U_4}{2} + \frac{U_5 + U_6}{2} - \frac{U_7 + U_8}{2} \right]$$

and the sensitivity is now $$S = \frac{1}{\omega\sigma} R_\perp [[U_4 - U_3] - [U_2 - U_1] + [U_8 - U_7] - [U_6 - U_5]]$$

FIG. 27 is a block diagram of an example of flowmeter electronics that can be used with the self calibration arrangements described above. Electrodes 1, 2, 3 and 4 of the flow tube 5 (similar to the one in FIG. 3) are connected to signal adding devices 6 and 7 and to signal differencing devices 8 and 9. The outputs of these are subtracted by differencing devices 10 and 11 giving signals $(U_4-U_3)-(U_2-U_1)$ and $(U_1+U_2)-(U_3+U_4)$ respectively. These are sent to phase-sensitive detectors 12 and 13 the outputs of which are proportional to $|R_1((U_4-U_3)-(U_2-U_1))|$ and $|R((U_1+U_2)-(U_3+U_4))|$ respectively. Where R and $R_1$ have been defined previously in connection with equations (2) and (3). The phase reference for 12 and 13 is derived from the current I used to power the electromagnet 14 and generated by 15, the device 16 serving to convert the alternating current to an alternating voltage. Phase-sensitive detectors 12 and 13 differ in that the output of 12 is a dc voltage proportional to the component of the input one right angle (90°) in advance of the reference phase while the output of 13 is a dc voltage proportional to the component of the input in phase with the reference. The dc signals from 12 and 13 are divided in 17 and then multiplied (in 18) by the output of a frequency to voltage converter 19. The output of 18 is thus proportional to $$\frac{|R[[U_1 + U_2] - [U_3 + U_4]]|}{\frac{1}{\omega}|R_\perp[[U_4 - U_3] - [U_2 - U_1]]|}$$

which by (4) and (5) is proportional to $\Delta U/S$ or to $\overline{v}$ (the mean velocity of the flow). Finally a scaling device 20 provides the signal for an indicator 21 of flow rate. The scaling factor of the device 20 being determined by calibration of the electronic circuit, by the sensitivity of the device 21 and by the electrode separation $\delta$ and the flow tube diameter.

CALIBRATION PROBE EMBODYING THE INVENTION

The application of the invention to eddy current probes will now be described with reference to FIGS. 28(a) and 28(b). Eddy current probes are devices used for measuring the sensitivity of any conventional electromagnetic flowmeter 51, with small electrodes 52 and 53. The probes are plates 54, 55 of insulating material designed to fit over the electrodes (FIG. 28(b)). During calibration the flowtube is mounted with its axis vertical and its lower end blanked off. It is filled with electrolyte (e.g. tap water or salted water) and with the probes in place and with the alternating magnetic field set up, the emfs $\epsilon_4$ and $\epsilon_5$ are measured across each pair of wires leading to small electrodes 56, 57 and 58, 59 on the liquid side of the plates. The plates are fitted so that the flowtube electrodes are covered and so than a straight line joining each probe electrode pair is parallel to the axis of the flowtube. This can be made easier through provision of a recess 100 on the back side of each probe and by shaping the plates so they fit the curvature of the internal flowtube surface. The distance $\delta$ between the probe electrodes must be small in relation to the flowtube diameter.

It will now be readily understood how the probe electrodes play the same role as the electrode pairs in a self-calibrating electromagnetic flowmeter and how the emfs $\epsilon_4$ and $\epsilon_5$ can be used (by means of the same formulae) to determine the sensitivity of the flowtube. Probes can of course be used for the calibration of meters with more than two electrodes (such as shown in FIG. 25) in a similar manner. The only difference between probes and self-calibrating meters is that the probes (and associated electronics) are used only occasionally to give spot readings of sensitivity whereas self-calibrating meters continuously correct for variations in sensitivity.

Calibration of electromagnetic flowmeters using eddy current probes is more economical than conventional calibration in flow rigs especially in the case of large size flowtubes.

Eddy current probe calibration gives only the flat profile sensitivity but from the known approximate shape of the magnetic field, or, from the known sensitivity verses Reynolds number characteristic, sensitivity at any Reynolds number can be inferred by calculation.

In the construction of the probes care should be taken to ensure that probe electrodes are as close to the tube wall as possible (probe plates as thin as possible). Also the wire 110 from electrode 56 and passing electrode 57 should be as close as possible to the straight line joining the electrode centres on the surface of the plate to help reduce unwanted flux linkage as in self-calibrating flowmeters.

A glossary of the scientific symbols used in this specification is as follows:

| Roman: | |
|---|---|
| $\underline{A}$, A | magnetic potential (vector and scalar) |
| $A_m(\beta)$ | fourier transform of F with respect to $\theta$ and z |
| b | tube radius |
| $\underline{B}$, B | magnetic flux density (vector and scalar) |
| $B_o$ | design magnetic flux density |
| $B'$ | deviation from design field $B_o$ |
| $B_c$ | magnetic flux density at flowtube centre |
| c | half-width (in z direction) of contactless electrode |
| C, C', $C_n$, $\bar{C}_n$, C± | constants used in contactless electrode analysis |
| d | distance along tube axis from centre of flowtube to edge of adjoining pipes |
| $\underline{D}$ | ($=\epsilon \underline{E}$) displacement current density |
| $\underline{E}$, E | electric field (vector and scalar) |
| $\underline{E}'$ | electric field in (parts of the magnet) including adjoining pipes |
| $\underline{E}_1$ | flow induced electric field |
| $\underline{E}_e$ | Eddy current electric field in insulating material in which contactless electrodes are normally situated but which are replaced by similar insulating material |
| $\underline{E}_i$ | eddy current electric field inside contactless electrodes |
| $(E_z)_l$, $(E_\theta)_l$ | values of $E_z$ and $E_\theta$ at the wall in the liquid |
| f | radius of idealised magnet core |
| $f_o$ | frequency |
| $f(\theta)$ | function used in contactless electrode analysis |
| F | magnetic potential (B = $\nabla$F) |
| h | half-length of coils in idealised magnet |
| H | magnetic field strength |
| i | $\sqrt{-1}$ |
| $I_m(\beta)$ | modified bessel function of order m |
| $\underline{j}$ | virtual current |
| $\underline{j}_o$ | design virtual current |
| $\underline{j}'$ | deviation from the design virtual current |
| $\underline{j}1$ | flow induced current density |
| $l_\tau$ | characteristic distance over which $\tau$ varies appreciably |
| R(X) | component of X in the reference phase direction |
| $R_\perp(X)$ | component of X one right angle in advance of the reference phase |
| $R_1$ | characteristic ratio of normal to tangential components of magnetic flux density |
| $R_2$ | ratio of maximum values of the z components of electric fields in adjoining pipes and in the liquid near the ends of the flowtube |
| S | flat profile flowtube sensitivity ($=\Delta U/v$) |
| t | time |
| $t_1$, $t_2$ | times at which flow signals are measured in general periodic excitation |
| U | flow induced electric potential |
| $U_1$, $U_2$ | electric potentials at ends of electrode wires |
| $U_g$ | value of U on the liner wall in contactless electrode analysis |
| $\underline{v}$ | flat profile fluid velocity |
| v | estimated mean velocity using self-calibration |
| $\underline{v}_o$ | flat velocity profile distribution |
| $\underline{v}'$, v' | deviation from flat profile distribution |
| $\underline{v}$ | velocity vector |
| V | volume of integration |
| w | width (in $\theta$ direction) of contactless electrode or of a part thereof |

| Greek: | |
|---|---|
| $\alpha$ | inverse of characteristic distance of variation of magnetic field in boundary condition studies |
| $\alpha_1$, $\alpha_2$ | coil angles in idealised magnet |
| $\alpha_o$ | half angle subtended by contactless electrode |
| $\beta$ | dummy variable in Fourier transform |
| $\delta$ | actual of effective spacing of electrodes in an electorde pair |
| $\delta_s$ | skin depth |
| $\delta'$ | small spacing between contactless electrode and liquid |
| $\Delta$ | half-separation between contactless electrodes |
| $\epsilon$ | permittivity |
| $\gamma$ | permeability |
| $\gamma_o$ | permeability of free space |
| $\sigma$ | conductivity |
| $\Sigma$ | area of integration |
| $\tau$ | contact surface impedance |
| $\phi$ | electric potential in eddy current studies |
| $\Phi$ | total magnetic flux through a circuit |
| $\omega$ | angular frequency ($=2\pi f_o$) |
| $\Omega$ | repetition angular frequency |

| Miscellaneous: | |
|---|---|
| x, y, z | cartesian coordinates |

| | -continued |
|---|---|
| r, φ z | polar coordinates |
| $x_x, x_y, x_z$ | cartesian components of $\underline{X}$ |
| $x^r, x^\phi, x_z$ | polar components of $\underline{X}$ |
| $(x)_t, (x)_n$ | tangential and normal components of $\underline{X}$ |
| $\underline{dl}$ | element of length |
| $dv$ | element of volume |
| $d\Sigma$ | element of area |
| $\delta U, \delta \overline{V}\delta S$ | changes in flow signal, and in estimated mean velocity and sensitivity respectively |
| $\Delta U$ | flow signal |
| $\xi, \xi_1 \xi_2$ | emfs generated across electorde pair |
| $\sqrt{\phantom{x}}$ | short for $\sqrt{(\alpha^2 + i \gamma \delta \omega)}$ |

I claim:

1. An electromagnetic flowmeter assembly comprising:
   an axially elongated flow tube, said flow tube defining a fluid flow passage;
   a magnet constructed and arranged to apply a periodically changing magnetic field across a section of said flow tube in a plane substantially transverse to the axis of said flow tube;
   at least three electrodes coupled to said flow tube, two of said electrodes being coupled to one side of said flow tube side-by-side on a line substantially parallel to the axis of said flow tube and one of said electrodes being coupled at a location on the opposite side of said flow tube;
   means coupled to said electrodes for determining the average potential between said side-by-side electrodes and the difference between the average potential and the potential of the electrode on the opposite side of the flow tube to derive a velocity measurement of a fluid medium passing through said flow tube; and
   means for determining the potential difference between said side-by-side electrodes to automatically compensate, in said velocity measurement, for an extraneous change in the applied magnetic field.

2. An electromagnetic flowmeter assembly comprising:
   an axially elongated flow tube including a tubular member formed from electrically insulating material, said flow tube defining a fluid flow passage;
   a magnet constructed and arranged to apply a periodically changing magnetic field across a section of said flow tube in a plane substantially transverse to the axis of said flow tube;
   at least three electrodes coupled to said flow tube in a manner characterized in that said electrodes are electrically insulated from said flow passage by said insulating material, two of said electrodes being coupled to one side of said flow tube side-by-side on a line substantially parallel to the axis of said flow tube and one of said electrodes being coupled at a location on the opposite side of said flow tube;
   means coupled to said electrodes for determining the average potential between said side-by-side electrodes and the difference between the average potential and the potential of the electrode on the opposite side of the flow tube to derive a velocity measurement of a fluid medium passing through said flow tube; and
   means for determining the potential difference between said side-by-side electrodes to automatically compensate, in said velocity measurement, for an extraneous change in the applied magnetic field.

3. The flowmeter assembly of claim 1 or 2 wherein said two side-by-side electrodes are disposed on one side of said flow tube and two other electrodes are disposed on the diametrically opposed side of said flow tube so that each of said side-by-side electrodes is paired with one of the diametrically opposed electrodes in a manner characterized in that a line joining any pair of electrodes is substantially perpendicular to the axis of said flow tube and the axis of the applied magnetic field, and further comprising means coupled to said two other electrodes for determining the average potential between said two other electrodes, wherein the velocity measurement is derived from a determination of the difference between the average potential between said two side-by-side electrodes and the average potential between said two other electrodes.

4. The flowmeter assembly of claim 1 or 2 wherein said side-by-side electrodes are spaced from each other by a distance less than the radius of said flow tube.

5. The flowmeter assembly of claim 1 wherein each of said electrodes is an arcuate electrode that forms an arc subtending an angle of order 2 radians.

6. The flowmeter assembly of claim 5 wherein the center portions of said arcuate electrodes substantially lie in a plane which contains the axis of said flow tube.

7. The flowmeter assembly of claim 5 wherein each of said electrodes includes a plurality slots for enabling correct averaging of the electrical measurements over the length of each of said electrodes.

8. The flowmeter assembly of claim 7 wherein said plurality of slots in each of said arcuate electrodes extend from one edge of each electrode and are distributed along the arcuate surface thereof.

9. The flowmeter assembly of claim 1 wherein each of said side-by-side electrodes includes a group of parallel arcuate electrodes comprising identical electrodes each provided with a plurality of slots extending from one edge and distributed along the curved surface thereof, said identical electrodes in each group being connected together by conductors.

10. The flowmeter assembly of claim 1 further comprising sheets of highly permeable material placed behind each of said electrodes.

11. The flowmeter assembly of claim 1 further comprising a laminated sheet covering at least a portion of the inner surface of said flow tube, said laminated sheet comprising elongated strips of conducting material, that are electrically insulated from each other, that are disposed lengthwise along the axis of the flow tube.

12. The flowmeter assembly of claim 1 wherein said flow tube further comprises an inner tubular member formed from high permeability metal which defines the fluid flow passage of the flow tube.

13. The flowmeter assembly of claim 1 further comprising adjoining inlet and outlet pipes for providing fluid to and removing fluid from said flow tube, respectively, wherein said inlet and outlet pipes are formed from low permeability metal.

14. The flowmeter assembly of claim 13 wherein said flow tube has flanged ends, said flanged ends including electrical insulation to avoid flux linkage between said flow tube and said adjoining inlet and outlet pipes.

15. The flowmeter assembly of claim 1 or 2 further comprising an integrator coupled to each of said sideby-side electrodes for integrating over time differential signals received across said side-by-side electrodes for determining the sensitivity of said flowmeter.

16. The flowmeter assembly of claim 5 wherein each of said arcuate electrodes has a length and a width whereby any one of said electrodes is curved along its length and is substantially un-curved along its width, wherein each of said side-by-side electrodes is separated from each other by a distance that is substantially smaller than the width of any one of said arcuate side-by-side electrodes.

17. The flowmeter assembly of claim 5 further comprising means for averaging the received electrical signals along the length of the curved portion of each of said side-by-side arcuate electrodes.

18. The flowmeter assembly of claim 17 wherein said averaging means comprises a plurality of pairs of conductors distributed along each of said side-by-side arcuate electrodes, wherein, for each pair of conductors, the conductors are coupled respectively to said side-by-side electrodes at the same radial positions.

19. The flowmeter of claim 1 wherein said electrodes are of small area so they can in effect be regarded as point electrodes.

* * * * *

UNITED STATES PATENT AND TRADEMARK OFFICE
CERTIFICATE OF CORRECTION

PATENT NO. : 5,398,553

DATED: March 21, 1995

INVENTOR(S) : John Hemp

It is certified that error appears in the above-identified patent and that said Letters Patent is hereby corrected as shown below:

Col 2 , line 44, delete "Juxtaposed" should be --juxtaposed--.

Col. 2, line 48, insert --respectively-- after 22b.

Col. 4, line 7, delete "$R_1(x)$-" and insert --$R_\perp(x)$- --.

Col. 4, line 14, "Just" should be --just--.

Col. 5, line 12, should read as follows:

$$S = \frac{1}{\omega\delta} R_\perp [(U_4 - U_3) - (U_2 - U_1)]$$

Col. 5, line 30, equation (6) should read as follows:

$$-\delta U = \int (\underline{v}_o + \underline{v}') \cdot (\underline{B}_o + \underline{B}') \times (\underline{j}_o + \underline{j}') dV - \int \underline{v}_o \, \underline{B}_o \times \underline{j}_o \, dv--$$

Col. 5, line 32, underline symbols $\underline{B}'$, $\underline{B}_o$, $\underline{j}'$, $\underline{j}_o$, $\underline{v}'$ and $\underline{v}_o$.

Col. 5, line 35, equation (7) should read as follows:

$$-\delta U = \int \underline{v}_o \cdot \underline{B}_o \times \underline{j}' dv + \int \underline{v}_o \cdot \underline{B}' \times \underline{j}_o dV + \int \underline{v}' \underline{B}_o \times \underline{j}_o dV--$$

Col. 5, line 40, equation (8) should read as follows:

$$\overline{V} = \frac{\Delta U}{S}$$

UNITED STATES PATENT AND TRADEMARK OFFICE
CERTIFICATE OF CORRECTION

PATENT NO. : 5,398,553

DATED : March 21, 1995

INVENTOR(S) : John Hemp

It is certified that error appears in the above-identified patent and that said Letters Patent is hereby corrected as shown below:

"Column 5, line 44, "σ v/v" should read —δ v/v—".

Col. 5, line 46, equation (9) should read as follows:

$$\frac{\delta \overline{v}}{\overline{v}} = \frac{\delta U}{U} - \frac{\delta S}{S}$$

Col. 5, line 67, equation (10) should read as follows:

$\int \underline{v}' \cdot \underline{B}' \times \underline{j}_o dV + \int \underline{v}' \cdot \underline{B}_o \times \underline{j}' dV$ Col. 6, line 6, "hence" should be --here--.

Col. 7, line 13, equation (12) should read as follows:

$$\frac{\partial U}{\partial r} = (\underline{v} \times B_r)$$

Col. 7, line 49, insert --is-- before small.

Col. 8, line 21, "∂T/∂z" should be --∂τ/∂z--.

Col. 8, line 48, equation (20) should read as follows:

$$-F(r,\theta,z) = \sum_{m=1,3...}^{\infty} \sin m\theta \int_{-\infty}^{\infty} A_m(\beta) I_m(\beta r) e^{i\beta z} d\beta--$$

UNITED STATES PATENT AND TRADEMARK OFFICE
CERTIFICATE OF CORRECTION

PATENT NO. : 5,398,553

DATED : March 21, 1995

INVENTOR(S) : John Hemp

It is certified that error appears in the above-identified patent and that said Letters Patent is hereby corrected as shown below:

Col. 9, line 8, should read as follows:

$$\oint \underline{E} \cdot \underline{dl} = -\dot{\Phi}$$

Col. 9, line 54, "5.9 x $10^6$" --5.9 x $10^8$--

Col. 9, line 68, in the first instance "x=0" should be --x<0--.

Col. 10, equation (23) should read as follows:

$$R_1 m \left| \frac{(B_x)\max}{(B_y)\max} \right| = \left| \frac{\mu}{\mu 0} \frac{a}{\sqrt{}} \right| = \frac{\mu}{\mu 0} \frac{a\delta_s}{((a\sigma)^4+4)^{1/4}}$$

Col. 10, line 6, "Y" should be --√--.

Col. 10, line 10, "(B)$_n$" should be --($\underline{B}$)$_n$--.

Col. 10, equation 24 and 25 should read as follows:

($\underline{B}$)$_t$ = 0 if $R_1$ > > 1

($\underline{B}$)$_n$ = 0 if $R_1$ < < 1

Col. 10, line 21, "tonal" should be --total--.

UNITED STATES PATENT AND TRADEMARK OFFICE
CERTIFICATE OF CORRECTION

PATENT NO.   : 5,398,553

DATED        : March 21, 1995

INVENTOR(S)  : John Hemp

It is certified that error appears in the above-identified patent and that said Letters Patent is hereby corrected as shown below:

Col. 10, line 36, "s/ 2" should read $$s/\sqrt{2}$$

Col. 10, line 44, insert --,-- after "material".

Col. 10, equation (26) should read as follows:

$$B_x = \frac{2e^{x\sqrt{}}}{1+\frac{\gamma 0}{\mu}\frac{\sqrt{}}{a}} \propto \cos ay$$

$$B_y = -\frac{2\sqrt{}e^{x\sqrt{}}}{1+\frac{\gamma 0}{\mu}\frac{\sqrt{}}{a}} \sin ay$$

Col. 11, the first equation should read as follows:

$$B_y = \left| \frac{2\sqrt{}}{1+\frac{\gamma 0}{\mu}\frac{\sqrt{}}{a}} \right|$$

UNITED STATES PATENT AND TRADEMARK OFFICE
CERTIFICATE OF CORRECTION

PATENT NO. : 5,398,553
DATED : March 21, 1995
INVENTOR(S) : John Hemp

It is certified that error appears in the above-identified patent and that said Letters Patent is hereby corrected as shown below:

Col. 11, equation (28) should read as follows:

$$\frac{B_{in}}{B_{out}} = \left| \frac{2\sqrt{}/a}{1 + \frac{\gamma 0}{\mu} \frac{\sqrt{}}{a}} \right| = \frac{2}{\frac{a\delta_s}{((a\delta_s)^4 + 4)^{1/4} +} + \frac{\gamma 0}{\mu}}$$

Col. 11, line 14, "$\sigma_s \ll s/\alpha$" should be $-\delta_s \ll 1/\alpha-$.

Col. 11, line 18, "We" should be --we--.

Col. 11, equation (29) should read as follows:

$$\left. E_z \right|_{x=0-} = 1\omega \frac{2\sin ay}{1 + \frac{\gamma 0}{\mu} \frac{\sqrt{}}{a}}$$

Col. 11, equation (30) should read as follows:

$$\left. E_z \right|_{x=0-} = 1\omega B \frac{1}{\alpha} \frac{2\sin ay}{1 + \frac{\gamma 0}{\mu} \frac{\sqrt{}}{a}}$$

UNITED STATES PATENT AND TRADEMARK OFFICE
CERTIFICATE OF CORRECTION

PATENT NO. : 5,398,553

DATED : March 21, 1995

INVENTOR(S) : John Hemp

It is certified that error appears in the above-identified patent and that said Letters Patent is hereby corrected as shown below:

Col. 11, equation (31) should read as follows:

$$F = \left| \frac{2\sin ay}{1 + \frac{\gamma o}{\mu} \frac{\sqrt{}}{a}} \right| \frac{R_1}{1+R_1}$$

Col. 12, line 3, "(in" should be --in--.

Col. 14, equation (32) should read as follows:

$$\nabla \cdot (\underline{j}_1 - 1\omega \varepsilon \underline{E}_1) = 0$$
$$\nabla \times \underline{E}_1 = 0$$
$$\underline{j}_1 = 0(\underline{E}_1 + \underline{v} \times \underline{B})$$
$$\left. \begin{array}{l} (\underline{E}_1)_t \\ (\underline{j}_1 - 1\omega \varepsilon \underline{E}_1)_n \end{array} \right\} \text{ continuous across internal surfaces}$$
$$-(\underline{E}_1)_t = \nabla_t [\tau (\underline{j}_1 - 1\omega \varepsilon \underline{E}_1)_n] \text{ at surface of magnet}$$

UNITED STATES PATENT AND TRADEMARK OFFICE
CERTIFICATE OF CORRECTION

PATENT NO. : 5,398,553

DATED : March 21, 1995

INVENTOR(S) : John Hemp

It is certified that error appears in the above-identified patent and that said Letters Patent is hereby corrected as shown below:

Col. 14, equation (35) should read as follows:

$$\frac{\partial u}{\partial r} = (\underline{v} \times Br) = -vB\theta \text{ on liner}$$

Col. 14, line 58, "12b" and should be --12d--.

Col. 15, equation (37) should read as follows:

$$= R(\overline{U}_{g12} - \overline{U}_{g34})$$

Col. 15, line 19, should read as follows:

$$\oint E \cdot d\underline{l} = \int_{\epsilon} 1\omega \underline{B} \cdot d\underline{\epsilon}$$

Col. 15, line 26, should read as follows:

$$\int_{gha} E \cdot d\underline{l} = U_g - U_a = -\varepsilon$$

Col. 15, equation (38) should read as follows:

$$\varepsilon = \int_{cde} E \cdot d\underline{l} - \int_{\epsilon} 1\omega \underline{B} \cdot d\underline{\epsilon}$$

UNITED STATES PATENT AND TRADEMARK OFFICE
CERTIFICATE OF CORRECTION

PATENT NO. : 5,398,553

DATED : March 21, 1995

INVENTOR(S) : John Hemp

It is certified that error appears in the above-identified patent and that said Letters Patent is hereby corrected as shown below:

Col. 15, line 36, "$\varepsilon$" should be --$\underline{E}$--. (2nd occurrance).

Col. 15, equation (39) should read as follows:

$$\nabla \underline{E} = 0$$
$$\nabla \times \underline{E} = 1\omega \underline{B}$$
$$(\underline{E})_n = 0 \text{ on liner}$$
$$-(\underline{E})_t = \nabla_t [\tau o (\underline{E})_n] \text{ on adjoining pipes}$$

Col. 15, equation (40) should read as follows:

$$\nabla \underline{E} = 0$$
$$\nabla \times \underline{E} = 1\omega \underline{B}$$
$$(\underline{E})_n = 0 \text{ on surface of the conductor}$$

Col. 16, line 10 "star:" should be --start--.

Col. 16, equation (41) should read:
$$\underline{E} = \underline{E}_e - \nabla\phi$$

Col. 16, equation (43) should read:
$$-(\nabla\phi)_t = -(\underline{E}_e)_t + (\underline{E}_1)_t$$

Col. 16, line 45 should read:
$$\int (\underline{E}_e - \nabla\phi) \cdot d\varepsilon = 0$$

Page 8 of 14

UNITED STATES PATENT AND TRADEMARK OFFICE
CERTIFICATE OF CORRECTION

PATENT NO.  : 5,398,553

DATED       : March 21, 1995

INVENTOR(S) : John Hemp

It is certified that error appears in the above-identified patent and that said Letters Patent is hereby corrected as shown below:

Col. 16, line 61, "$E_{73}$" should be --$E_\ominus$-- in both instances.

Col. 19, line 25 should read:

$$\underline{E} = \underline{E}_e - \nabla\phi$$

Col. 19, line 29, should read:

$$\int_{cde} \underline{E}_e \cdot d\underline{l} \to 0 \text{ for } \Delta \to 0$$

Col. 19, line 34 should read:

$$-\int_{cde} \nabla\phi \cdot d\underline{l} = \phi_c - \phi_e$$

Col. 19, line 40 should read:

$$\varepsilon = \phi_c - \phi_2$$

Col. 19, line 45 should read:

$$\phi_c - \phi_2 = \phi(\ominus_1 - \Delta) - \phi(\ominus_1 \Delta)$$

Col. 20, line 27 should read:

$$\overline{\varepsilon} = 2c(\overline{E}_z)_1$$

UNITED STATES PATENT AND TRADEMARK OFFICE
CERTIFICATE OF CORRECTION

PATENT NO.   : 5,398,553

DATED        : March 21, 1995

INVENTOR(S)  : John Hemp

It is certified that error appears in the above-identified patent and that said Letters Patent is hereby corrected as shown below:

Col. 20, line 60 should read as follows:

$$- \varepsilon_0 - \varepsilon_1 = \int_0^{\theta_1} ((E_\theta)_1 |_{z-\Delta} - (E_\theta)_1 |_{z-\Delta}) b d\theta --.$$

Col. 21, line 1, "G", should be --θ--.

Col. 21, equation (59), should read as follows:

$$-- \quad \Phi_n(\theta, z) = (E_z)_1 (z - \bar{z}_n) + b(E_\theta)_1 (\theta - \bar{\theta}_n) + \bar{C}_n \quad --.$$

Col. 21, line 25

$$"(\theta_n, \bar{z}_n)" \text{ should be } --(\bar{\theta}_n, \bar{z}_n)--.$$

Col. 21, lines 45-47 as follows:

$$\varepsilon_n = \Phi_1(\theta_i - \Delta) - \Phi_n(\theta, \Delta)$$
$$= (E_z)_1(-\Delta - \bar{z}_n) + b(E_\theta)_1(\theta - \bar{\theta}_n) + \bar{C}_n -$$
$$[(E_z)_1(\Delta - z_n) + b(E_\theta)_1(\theta - \theta_n) + C_n]$$

UNITED STATES PATENT AND TRADEMARK OFFICE
CERTIFICATE OF CORRECTION

PATENT NO.   : 5,398,553

DATED        : March 21, 1995

INVENTOR(S)  : John Hemp

It is certified that error appears in the above-identified patent and that said Letters Patent is hereby corrected as shown below:

Col. 21, line 49

$$\text{`` }e_n = e_n\text{ ''} \text{ should be } -- e_n = \bar{e}_n --.$$

Col. 21, line 52 should read as follows:

$$\varepsilon_n = 2(E_z)_1 c + \bar{C}_n + C_n$$

Col. 21, line 57 should read as follows:

$$\varepsilon = \frac{1}{N}\sum_{n=1}^{N}\varepsilon_n = 2_c(\bar{E}_z)_1 + \frac{1}{N}\sum_{n=1}^{N}\bar{C}_n + \frac{1}{N}\sum_{n=1}C_N$$

Col. 21, equation (61) should read as follows:

$$\varepsilon = 2_c(\bar{E}_z)_1$$

Col. 23, line 17 should read as follows:

$$\varepsilon = \phi-(\theta,-\Delta) - \phi+(\theta,\Delta)$$

UNITED STATES PATENT AND TRADEMARK OFFICE
CERTIFICATE OF CORRECTION

PATENT NO. : 5,398,553

DATED : March 21, 1995

INVENTOR(S) : John Hemp

It is certified that error appears in the above-identified patent and that said Letters Patent is hereby corrected as shown below:

Col. 23, line 45 should read as follows:

$$\varepsilon = 2c(\overline{E}_z)_1$$

Col. 23, line 48, "e.g." should be --eg--.

Col. 24, equation (67) should read as follows:

$$\sum_{n=1}^{3N} c_n = \sum_{n=1}^{3N} \overline{c}_n = 0$$

Col. 24, line 25 should read as follows:

$$\varepsilon = \phi_c - \phi_2$$

Col. 24, line 43 should read as follows:

$$\varepsilon = \frac{1}{3N} \sum_{n=1}^{3N} \varepsilon_n = 2c(\overline{E}_z)_1 + \frac{1}{3N} \sum_{n=1}^{3N} c_n + \frac{1}{3N} \sum_{n=1}^{3N} \overline{c}_n$$

Col. 24, line 47 should read as follows:

$$\varepsilon = 2c(\overline{E}_z)_1$$

UNITED STATES PATENT AND TRADEMARK OFFICE
CERTIFICATE OF CORRECTION

PATENT NO. : 5,398,553

DATED : March 21, 1995

INVENTOR(S) : John Hemp

It is certified that error appears in the above-identified patent and that said Letters Patent is hereby corrected as shown below:

Col. 25, line 11 should read as follows:

$$\nabla \times \underline{E} = i\omega \underline{B}$$

Col. 25, line 42, "sheen" should be --sheet--.

Col. 25, line 59,

'$\overline{E}$' should be -- $\underline{E}$ --.

Col. 26, line 6,

'$\overline{E}_1$' should be -- $\underline{E}_1$ --.

Col. 26, line 65, "|z| 22 d" should be -- |z| $\rangle$ d --.

Col. 27, line 16 "|z| 22 d" should be -- |z| $\rangle$ d --.

Col. 27, line 43,

'$\overline{E}$-field' should be -- $\underline{E}$-field --.

Col. 27, line 61,

'$\overline{E}$-field' should be -- $\underline{E}$-field --.

UNITED STATES PATENT AND TRADEMARK OFFICE
CERTIFICATE OF CORRECTION

PATENT NO. : 5,398,553

DATED : March 21, 1995

INVENTOR(S) : John Hemp

It is certified that error appears in the above-identified patent and that said Letters Patent is hereby corrected as shown below:

Col. 28, line 28, "$R_1$" should be --$R_\perp$--.

Col. 28, line 30, "$R_1$" should be --$R_\perp$--.

Col. 29, line 6, "than" should be --that--.

Col. 30, line 38, "$\underline{v}$" should be --v--.

Col. 30, line 39, "$v$" should be --$\overline{v}$--.

Signed and Sealed this

Eighth Day of April, 1997

BRUCE LEHMAN

*Attest:*

*Attesting Officer*     Commissioner of Patents and Trademarks